United States Patent
Byun et al.

(10) Patent No.: US 7,021,547 B2
(45) Date of Patent: Apr. 4, 2006

(54) COUNTER-TOP SCANNER WITH BUMP PROTECTION MECHANISM AND SCAN ANGLE ADJUSTMENT MECHANISM

(75) Inventors: Sung Ho Byun, Cherry Hill, NJ (US); Mark C. Schmidt, Williamstown, NJ (US); Garrett K. Russell, Wilmington, DE (US); Frank J. Travea, Medford, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 10/885,245

(22) Filed: Jul. 7, 2004

(65) Prior Publication Data

US 2005/0040238 A1    Feb. 24, 2005

Related U.S. Application Data

(63) Continuation of application No. 10/043,900, filed on Jan. 11, 2002, now abandoned.

(51) Int. Cl.
*G06K 7/10* (2006.01)

(52) U.S. Cl. .................................. 235/462.43

(58) Field of Classification Search ............ 235/462.14, 235/462.3, 462.31, 462.43, 462.45, 472.01, 235/472.03, 462.32
See application file for complete search history.

(56) References Cited

U.S. PATENT DOCUMENTS

| | | | | |
|---|---|---|---|---|
| 3,947,816 A | * | 3/1976 | Rabedeau | 235/462.4 |
| 4,387,297 A | * | 6/1983 | Swartz et al. | 235/462.21 |
| 4,575,625 A | * | 3/1986 | Knowles | 235/462.3 |
| 4,624,528 A | * | 11/1986 | Brueggemann | 359/216 |
| 4,766,297 A | * | 8/1988 | McMillan | 235/462.07 |
| 4,939,356 A | * | 7/1990 | Rando et al. | 235/462.2 |
| 5,132,524 A | * | 7/1992 | Singh et al. | 235/462.39 |
| 5,237,161 A | * | 8/1993 | Grodevant | 235/462.31 |
| 5,371,347 A | * | 12/1994 | Plesko | 235/462.15 |
| 5,478,997 A | * | 12/1995 | Bridgelall et al. | 235/462.25 |
| 5,504,316 A | * | 4/1996 | Bridgelall et al. | 235/462.07 |
| 5,543,609 A | * | 8/1996 | Giordano et al. | 235/462.43 |
| 5,691,528 A | * | 11/1997 | Wyatt et al. | 235/462.07 |

* cited by examiner

*Primary Examiner*—Thien M. Le
*Assistant Examiner*—Lisa M. Caputo

(57) ABSTRACT

An improved counter-top bar code scanner is equipped with a bump protection mechanism and a scan angle adjustment mechanism. The bump protection mechanism is provided in the form of a protective sheath fabricated of a shock-absorbing material. The scan angle adjustment mechanism is provided in the form of a movable bracket adjustably mounted to the scanner housing. If the bracket is mounted to a fixed surface, the bracket remains fixed but permits adjustments of the housing to any of the plurality of positions relative to the fixed surface.

51 Claims, 26 Drawing Sheets

COUNTER-TOP SCANNER WITH BUMP PROTECTION MECHANISM AND SCAN ANGLE ADJUSTMENT MECHANISM

RELATED CASES

This is a continuation of U.S. patent application Ser. No. 10/043,900, filed Jan. 11, 2002 now abandoned, which is hereby incorporated by reference.

BACKGROUND OF THE INVENTION

1. Field of the Invention

The present invention relates generally to laser scanning systems, and more particularly to countertop bar code scanners that are equipped with adjustable mounting mechanisms and adapted to operate in an automatic "hands-free" mode of operation.

2. Description of Background Art

Optical scanners of various types have been developed for scanning and decoding bar code symbols. These scanners adapt readily to some operational environments, but present shortcomings when used in other situations. For example, consider system applications involving point-of-sale (POS) terminals in retail stores and supermarkets, inventory and document tracking, and diverse data control applications. Retail point-of-sale counters are prime sales areas Display designs and product offerings may change on a regular basis. Inventory and document tracking involves scanning a number of items or documents of widely varying shapes and sizes. Diverse data control applications may involve managing data flow on a factory assembly line where a variety of components and processes must be tracked. These applications demand a bar code scanner that presents some degree of mechanical flexibility for use in any of a wide range of operational environments.

Many existing bar code scanner designs are inadequately equipped to deal with the mechanical strains and stresses of day-to-day use. In many point-of-sale and factory environments, scanners are dropped, banged, and bumped. Delicate optical components may be damaged or misaligned, causing the performance of the scanner to degrade over time. Unfortunately, virtually all existing scanners are fabricated of high-impact polystyrene plastic, which provides only limited protection against mechanical shocks and bumps.

In addition to lacking mechanical ruggedness, bar code scanners suffer from other deficiencies. Existing scanners generally fall into one of two general categories: hand-held or stationary. The first category includes manually-actuated trigger-operated scanners, as well as automatically actuated hand-held scanners which do not utilize a triggering mechanism. The user positions the hand-held laser scanner at a specified distance from the object bearing the bar code. In the case of an automatically actuated scanner, the presence of the object is automatically detected, the presence of a bar code symbol on the object is detected, and thereafter the bar code symbols automatically read. In the case of trigger-operated scanners, the user positions the scanner at the specified distance from an object bearing a bar code symbol, manually activates the scanner to initiate reading and then moves the scanner over other objects bearing symbols to be read. Prior art trigger-operated bar code readers are disclosed in U.S. Pat. Nos. 4,387,297 to Swartz; U.S. Pat. No. 4,575,625 to Knowles; U.S. Pat. No. 4,845,349 to Cherry; U.S. Pat. No. 4,825,057 to Swartz, et al.; U.S. Pat. No. 4,903,848 to Knowles; U.S. Pat. No. 5,107,100 to Shepard, et al.; U.S. Pat. No. 5,080,456 to Katz, et al.; and U.S. Pat. No. 5,047,617 to Shepard, et al. Automatic laser-based bar code symbol reading systems are disclosed in U.S. Pat. No. 4,639,606 to Boles, et al., and U.S. Pat. No. 4,933,538 to Heiman, et al.

Several hand-held scanners have been developed to provide "omnidirectional" scanning, so as to permit reading of a bar code irrespective of its specific orientation within the scanning pattern. Examples of such systems include the NCR 7890 presentation scanner from the NCR Corporation and the LS9100 omnidirectional laser scanner from Symbol Technologies, Inc. Although these systems provide both hands-free as well as hands-on modes of operation, each of these systems suffers from a number of shortcomings. In particular, the spatial extent of the scan pattern produced from these scanners frequently results in the inadvertent scanning of code symbols on products placed near the scanner during its hands-free mode of operation. On the the other hand, in the hands-on mode of operation, it is virtually impossible to use these scanners to read bar code symbol menus provided in diverse application environments. In each of these scanner designs, the scanner is tethered to its base unit by a power/signal cord, and the user is required to handle the scanner housing in an awkward manner in the hands-on mode of operation, resulting in strain and fatigue and thus a decrease in productivity. In addition, the control structure provided in each of these hand-held projection scanners operates the scanner components in a manner which involves inefficient consumption of electrical power, and prevents diverse modes of automatic code symbol reading which would be desired in many portable scanning environments.

Hand-held scanners are not convenient to use in assembly-line applications where the user processes bar coded objects over an extended period of time, or where the user requires the use of both hands in order to manipulate objects. In other applications, hand-held scanners are difficult to manipulate while simultaneously moving objects or performing other tasks at a point-of-sale terminal. Stationary scanners, on the other hand, provide a degree of flexibility in many applications by allowing the user to manipulate bar coded objects with both hands. However, by their nature, stationary laser scanners render scanning large, heavy objects a difficult task, as such objects must be manually moved into or through the laser scan field.

One type of stationary scanner is frequently mounted within a checkout counter of a supermarket or other retail point-of-sale environment. Such "in-counter" or "presentation" scanners could also be employed in conjunction with conveyors at a factory assembly line. These scanning systems include a scanning window or aperture at the top of the scanner housing through which a scanning pattern is projected. The scanning pattern is typically provided in the form of a plurality of multi-directional scanning lines. When an item bearing a bar code is brought into the field of the scan pattern so that at least one of the scanning lines completely traverses the bar code, light is reflected from the bar code and received back through the window.

Stationary in-counter and presentation scanners use a variety of optical configurations to develop omnidirectional scanning patterns. These omnidirectional patterns are intended to ensure that at least one scanning line will cross a bar code symbol to be read, irrespective of the bar code's orientation within the scanning pattern. Examples of omni-directional scanning patterns include comb patterns, orthogonal patterns, interlaced patterns, star-like patterns, lissajous patterns, and the like. While such scanners may be suitable for certain applications, the physical configuration of the optical components necessary to produce such complex omnidirectional patterns has resulted in scanner housings which are quite large and bulky. Moreover, the window of a counter-top or presentation scanner generally faces in a single, fixed direction. To change the direction of the scanning window and, thus, the orientation of the scanning pattern, it is necessary to relocate the entire housing. In many applications, this is inconvenient, especially when there is limited counter space.

One example of a stationary scanner, disclosed in U.S. Pat. No. 4,713,532, produces a scanning pattern having three groups of intersecting lines. These line groups form a large "sweet spot" which permits substantially omnidirectional reading of bar codes. The '532 scanner has a compact housing with a relatively small footprint, and is mountable on or in a counter. Depending upon the orientation of the window, the scanning pattern may be projected horizontally, vertically, or at an angle. An example of a scanner constructed in accordance with the '532 patent is the MS260 scanner, available from Metrologic Instruments of Blackwood, N.J. However, once the scanner was mounted in a given orientation, it was fixed and could not be easily moved.

Another example of a stationary scanner is disclosed in U.S. Pat. No. 5,216,231. This scanner is mountable on an adjustable base positioned above a counter. The base is constructed to permit the scanner housing to be adjusted in any of a variety of directions so that the scanning pattern will be projected at a desired orientation with respect to the counter. However, the base must be permanently secured to the countertop, which prevents the scanner from being lifted by hand to scan large or bulky items which do not fit on the countertop.

An attempt to combine the advantages of a hand-held scanner and a stationary scanner, U.S. Pat. No. 5,767,501 describes a hand-held scanner mounted in the head of a hand-supportable housing. The housing can also be supported in a separate base for hands-free presentation or countertop scanning. The base unit is mountable to a counter, and is equipped with a pivoting receptacle. The pivoting receptacle permits the scanning window and, hence, the scanning pattern, to be adjustable about a horizontal axis. Unfortunately, the user must return the hand-supportable housing to the base unit after each scan, requiring a realignment of the handle and handle receiving portions. This realignment process becomes tedious and annoying with repeated use. Moreover, the base unit is large and cumbersome for use in many point-of-sale environments.

Another attempt to combine the advantages of a hand-held scanner and a stationary scanner, U.S. Pat. No. 4,766,297 discloses a bar code scanning system which can be used in either a hands-on or hands-free mode of operation. The scanning system includes a portable hand-held laser scanning device for generating electrical signals corresponding to a scanned bar code symbol. In the hands-on mode of operation, a trigger is manually actuated each time the scanner operator wishes to read a bar code symbol on an object. The system also includes a fixture having a head portion for receiving and supporting the hand-held scanner, and a base portion above which the head portion is supported at a predetermined distance. In the hands-free mode of operation, the scanner is supported by the fixture head portion above the fixture base portion in order to allow objects bearing bar code symbols to pass between the head and base portions. In order to detect the presence of an object between the head and base portions, the fixture also includes an object sensor operably coupled to the scanner. When the object sensor senses an object between the head portion and the base portion, the sensor automatically causes the scanner, while supported in the fixture, to read the bar code symbol on the detected object.

Whereas bar code symbol scanning systems of the type disclosed in U.S. Pat. No. 4,776,297 permit reading of printed bar code information using either a portable (hands-on), or stationary (hands-free) mode of operation, such systems suffers from several significant drawbacks. For example, assume that it is desired to scan a large, heavy object such as an 80-lb. bag of concrete. The scanner operator could use the scanner in the hands-on mode of operation, but they would need to manually actuate a trigger each time the bar code symbol is to be read. If the scanner operator needs to move the bag into position, this is a two-handed job in itself, and the task of manipulating a trigger on the scanner during this positioning process is cumbersome and tedious at best. On the other hand, in the hands-free mode of operation, the heavy bag must be passed between the head and base portions of the fixture. If the bag will not fit between the head and the base portions, then one must resort to triggered operation.

Another scanning configuration is disclosed in U.S. Pat. No. 5,479,002. A scan head is adjustably mounted in a ball-and-socket joint on a scan module or housing. The scan head is movable about three mutually orthogonal axes, so as to allow the operator to steer the light beam emitted from the head. However, the '002 patent does not disclose or suggest any technique for combining the scan head and lower housing into a single package that is conveniently hand-held, but that can also be used as a free-standing scanner. Moreover, the design of the '002 housing is directed to a single-line scanning pattern and would not lend itself to production of an omnidirectional scanning pattern.

Additional attempts to produce omnidirectional scanners having adjustable housings or bases include the Model LS9100 Scanner, available from Symbol Technologies, and the Duet Scanner, available from PSC. Unfortunately, both of these scanners require the user to remove the hand-held scanner from a stand for hand-supported scanning.

Thus, there is a great need in the bar code symbol reading art for a bar code symbol reading system which overcomes the above described shortcomings and drawbacks of prior art devices and techniques, while providing greater versatility in its use. A need remains for a scanner configuration that is adjustable about one or more axes with respect to the base, but that does not entail the inconvenience of a separate scanner and stand. This configuration would permit omnidirectional bar code scanning from a hands-free standing position on a countertop or work surface, as well as from a hand-supported position for scanning large, heavy, or bulky items without requiring the scanner operator to repeatedly remove and/or replace the scanner in its stand.

OBJECTS AND SUMMARY OF THE INVENTION

It is an object of the invention to provide a bar code scanner that is mechanically rugged, so as to endure environmental shock and applied mechanical stresses such as drops and bumps.

It is a further object of the invention to provide a self-standing bar code scanner that need not be permanently mounted to a work surface.

It is a still further object of the invention to provide a bar code scanner which occupies a relatively small footprint on a work surface. It is another object of the present invention to provide a bar code scanner that can operate in a hands-free mode, and can also be picked up with a single hand.

It is a further object of the invention to provide a bar code scanner with an omnidirectional scanning pattern so as to permit reading of bar codes presented to the scanner.

It is a still further object of the invention to provide a bar code scanner with an omnidirectional scanning pattern so as to permit reading of bar codes that are passed through the scanning pattern.

It is another object of the invention to provide an automatic bar code symbol reading system having an automatic hand-supportable laser scanning device which can be used at a point-of-sale (POS) station as either a portable hand-supported laser scanner when operated in its automatic hands-on mode of operation, or as a stationary laser projection scanner when operated in its automatic hands-free mode of operation.

It is another object of the present invention to provide such an automatic bar code symbol reading system, wherein a highly collimated laser scanning pattern is projected about a projection axis, and comprises scanning planes which intersect within a confined scanning volume extending about the projection axis so that bar code symbols disposed within the scanning volume can be read omnidirectionally, while inadvertent scanning of bar code symbols outside of the scanning volume is prevented.

It is another object of the present invention to provide such an automatic bar code symbol reading system, wherein the confined scanning volume is substantially symmetrically disposed about an axis perpendicular to the plane of the scanner window.

Another object of the present invention to provide an automatic hand-supportable omnidirectional scanner with a hand-supportable housing that allows to user to easily control the direction of its projection axis by way of the outer casing of the housing, and thus align the narrowly confined scanning volume; of the scanner with the bar code symbol on the object to be scanned and identified.

Another object of the present invention to provide a portable automatic hand-supportable omnidirectional laser projection scanner with a power-conserving control system that provides battery power to the system components of the scanner in an intelligent manner.

Another object of the present invention to provide an automatic hand-supportable omnidirectional scanner with a housing that visually, indicates the direction of the projection axis, for intuitive hand-supported omnidirectional scanning of bar code symbols within the confined scanning volume extending thereabout.

It is another object of the present invention to provide such an automatic bar code symbol reading system, in which one or more bar code symbols on an object can be automatically read in a consecutive manner.

A further object is to provide such an automatic bar code symbol reading device, in which the hand-supportable bar code scanner has an infrared light object detection field which spatially encompasses at least a portion of its volumetric scanning field along the operative scanning range of the device, thereby improving the laser beam pointing efficiency of the device during the automatic bar code reading process.

Another object of the present invention is to provide an automatic bar code symbol reading system, in which battery power from a supply within the housing is automatically metered out and provided to the power distribution circuitry thereof for a predetermined time period which is reset upon the occurrence of either the manual actuation of an externally mounted power reset button, the reading (i.e. scanning and decoding) of a valid bar code symbol, or the placement of the hand-supportable bar code symbol reading device on a work surface and/or counter top.

A further object of the present invention is to provide such an automatic bar code symbol reading device, with a novel automatic power control circuit that effectively conserves the consumption of battery power therein, without compromising the operation, or performance of the device during its diverse modes of automatic operation.

It is another object of the present invention is to provide an automatic hand-supportable bar code reading device having both long and short-range modes of bar code symbol reading, automatically selectable in a variety of different ways, (e.g. by placing the hand-supportable device on a countertop or work surface, or removing it therefrom).

Another object of the present invention is to provide such a multi-mode automatic bar code symbol reading device, so that it can: be used in various bar code symbol reading applications, such as, for example, charge coupled device (CCD) scanner emulation, counter-top projection scanning in the hands-free long-range mode of operation, or the like.

Another object of the present invention is to provide an automatic hand-supportable bar code reading device with a programmably selectable mode of operation that prevents multiple reading of the same bar code symbol due to dwelling of the laser scanning beam upon a bar code symbol for an extended period of time, yet allows a plurality of bar code symbols (e.g. representing the same UPC) to be read in a consecutive manner even though they are printed on the same, or apparently the same, object or surface, as often is the case in inventory scanning applications.

A further object of the present invention is to provide a point-of-sale station (POS) incorporating the automatic bar code symbol reading system of the present invention.

It is a further object of the present invention is to provide an automatic hand-supportable bar code reading device having a control system which has a finite number of states through which the device may pass during its automatic operation, in response to diverse conditions automatically detected within the object detection and scanning fields of the device.

Another object of the present invention is to provide a portable, automatic bar code symbol reading device, wherein the laser beam scanning motor is operated at a lower angular velocity during its object detection state to conserve battery power consumption and facilitate rapid steady-state response when the device is induced into its bar code symbol detection and bar code symbol reading states of operation.

Another object of the present invention is to provide a portable automatic bar code symbol reading device, wherein the laser beam scanning motor is denergized during its object detection state to conserve battery power consumption, and is momentarily overdriven to facilitate rapid steady-state response when the device undergoes a transition from the object detection state to the bar code symbol detection state of operation.

Another object of the present invention is to provide a novel mechanism for mounting a projection laser scanning platform within the housing of an automatic hand-supportable omnidirectional projection laser scanner.

Another object of the present invention is to provide a novel omnidirectional laser scanning platform for use within an automatic portable projection laser scanner.

Another object of the present invention is to provide a bar code symbol reading system having at least one hand-supportable bar code symbol reading device which, after each successful reading of a code symbol, automatically synthesizes and then transmits a data packet to a base unit positioned within the data transmission range of the bar code symbol reading device, and upon the successful receipt of the transmitted data packet and recovery of symbol character data therefrom, the base unit transmits an acoustical acknowledgement signal that is perceptible to the user of the bar code symbol reading device residing within the data transmission range thereof.

A further object of the present invention is to provide such a system with one or more automatic (i.e., triggerless) hand-supportable laser-based bar code symbol reading devices, each of which is capable of automatically transmitting data packets to its base unit after each successful reading of a bar code symbol.

A further object of the present invention is to provide such a bar code symbol reading system in which the hand-supportable bar code symbol reading device can be used as either a portable hand-supported laser scanner in an automatic hands-on mode of operation, or as a stationary laser projection scanner in an automatic hands-free mode of operation.

A further object of the present invention is to provide such a bar code symbol system in which the base unit contains a battery recharging device that automatically recharges batteries contained in the hand-supportable device when the hand-supportable device is supported within the base unit.

It is another object of the present invention to provide such an automatic bar code symbol reading system with a mode of operation that permits the user to automatically read one or more bar code symbols on an object in a consecutive manner.

A further object of the present invention is to provide such an automatic bar code symbol reading system, in which a plurality of automatic hand-supportable bar code symbol reading devices are used in conjunction with a plurality of base units, each of which is assigned to a particular bar code symbol reading device.

A further object of the present invention is to provide such an automatic bar code symbol reading system, in which radio frequency (RF) carrier signals are used by each hand-supportable bar code symbol reading device to transmit data packets to respective base units.

A further object of the present invention is to provide such an automatic bar code symbol reading system, in which a novel data packet transmission and reception scheme is used to minimize the occurrence of data packet interference at each base unit during data packet reception.

A further object of the present invention is to provide such an automatic bar code symbol reading system, in which the novel data packet transmission and reception scheme enables each base unit to distinguish data packets associated with consecutively different bar code symbols read by a particular bar code symbol reading device, without the transmission of electromagnetic-based data packet acknowledgment signals after receiving each data packet at the base unit.

It is a further object of the present invention to provide an automatic hand-supportable bar code reading device having a control system which has a finite number of states through which the device may pass during its automatic operation, in response to diverse conditions automatically detected within the object detection and scan fields of the device.

It is yet a further object of the present invention to provide a portable, fully automatic bar code symbol reading system which is compact, simple to use and versatile.

Yet a further object of the present invention is to provider a novel method of reading bar code symbols using an automatic hand-supportable omnidirectional laser scanning device.

These and other objects of the present invention are realized in the form of an improved counter-top bar code scanner that is equipped with a bump protection mechanism and a scan angle adjustment mechanism. The bump protection mechanism is provided in the form of a protective sheath fabricated of a shock-absorbing material. The scan angle adjustment mechanism is provided in the form of a movable bracket adjustably mounted to the scanner housing. The bracket permits adjustment of the housing relative to the bracket. For example, if the bracket is mounted to a fixed surface, the bracket remains fixed but permits adjustments of the housing to any of a plurality of positions relative to the fixed surface. According to one preferred embodiment of the invention, the movable bracket permits adjustment of the housing to at least any of the two positions along an axis of rotation. In this manner, the coverage area of the scanning pattern may be adjusted and/or resituated.

When the movable bracket is rested upon a work surface or countertop, the scanner operates in an automatic, hands-free mode. When the scanner and movable bracket are lifted from the work surface or countertop, the scanner operates in an automatic, hand-held mode. The scanning pattern permits reading of bar codes presented to the scanner, as well as bar codes that are passed through the scanning pattern. Taken together, the bar code scanner housing and bracket provide a self-standing bar code scanner that need not be permanently mounted to a work surface. Pursuant to a further embodiment of the invention, the shock-absorbing encasement is removable to permit cleaning and/or replacement of the material, and/or to permit servicing of the bar code scanner.

In this manner, the invention provides a rugged bar code symbol reading system having an automatic hand-supportable scanning device which can be used at a point-of-sale (POS) station as either a portable hand-supported laser scanner, or as a stationary laser projection scanner. This configuration permits omnidirectional bar code scanning from a hands-free standing position on a countertop or work surface, as well as from a hand-supported position for scanning large, heavy, or bulky items without requiring the scanner operator to remove and/or replace a scanner in a stand.

BRIEF DESCRIPTION OF THE DRAWINGS

For a more complete understanding of the Objects of the Invention, the Detailed Description of the Preferred Embodiments of the Invention should be considered in conjunction with the accompanying drawings.

DETAILED DESCRIPTION OF THE PREFERRED EMBODIMENTS

Figure 1:
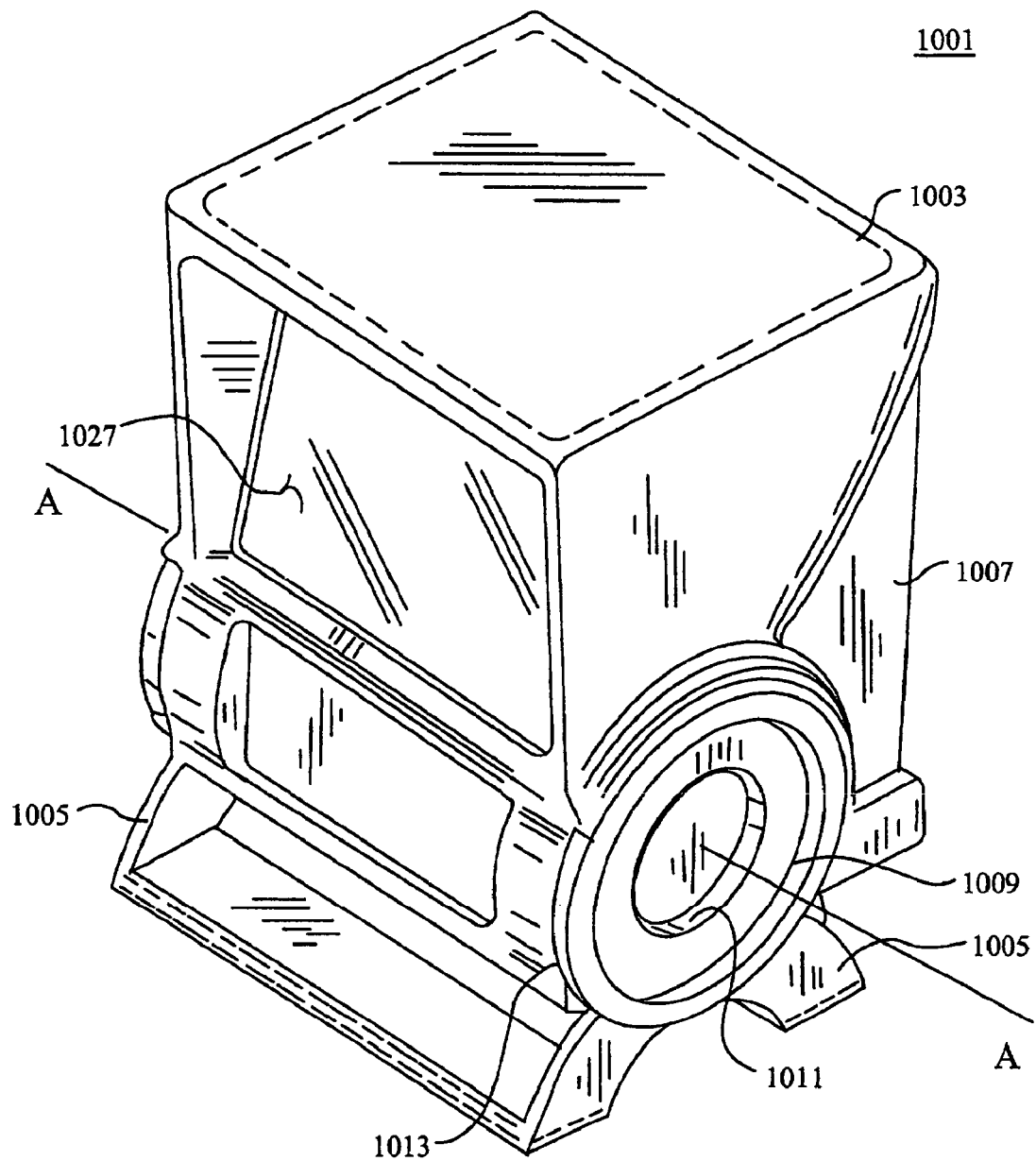
FIG. 1 is a perspective view of a multi-purpose bar code scanner that is hand-supportable, free-standing, and/or mountable, the scanner having a housing that is adjustably mounted to a movable bracket, wherein the housing and movable bracket are configured according to a first embodiment of the invention, the housing including a substantially omnidirectional laser scanning platform mounted therein.

FIG. 1 is a perspective view of a multi-purpose bar code scanner 1001 that is hand-supportable, free-standing, and/or mountable, wherein the scanner is configured according to a first embodiment of the invention. The scanner has a housing 1007 that is adjustably mounted to a movable bracket 1005, in the sense that bracket 1005 is movable relative to housing 1007. Accordingly, if movable bracket 1005 is mounted to a fixed surface such as a countertop, the movable bracket 1005 will remain fixed, but will permit adjustment of housing 1007 to any of a plurality of positions. One or more of these positions aim a window 1027 of housing 1007 towards the countertop surface and/or a point-of-sale area. Housing 1007 is equipped with a shock-absorbing mechanism in the form of protective sheath 1003. Protective sheath 1003 may be fabricated of rubber, flexible plastic, and/or any of various other materials capable of absorbing mechanical shock. Protective sheath 1003 may be fabricated so as to permit removal of the sheath from housing 1007, or, alternatively, the sheath could be designed as a permanent part of housing 1007. Protective sheath 1003 functions to protect bar code scanner 1001 against damage if the unit is dropped or banged. In addition to protecting window 1027 from damage, protective sheath 1003 also protects the four upper and four lower corners of the approximately cube-shaped bar code scanner 1001 of FIG. 1.

Housing 1007 includes a substantially omnidirectional laser scanning platform mounted therein, which will be described hereinafter with reference to FIGS. 11–13 and 15–21. This omnidirectional laser scanning platform projects a substantially omnidirectional scanning pattern through window 1027. Optionally, housing 1007 may also be provided with top-mounted, front-mounted, or side-mounted LED power and/or LED "good read" indicators. Housing 1007 is preferably molded of hard plastic or the like, and can be formed in two half-sections with tongue-and-groove edges for an interlocking fit. Window 1027 is generally square and/or rectangular in configuration and mounted in an aperture of housing 1007. Illustratively, window 1027 could be seated in, and/or held by, one or more grooves or projections formed in housing 1007. Window 1027 may be fabricated of a square and/or rectangular section of transparent acrylic-type plastic with optical filtering properties such as described in detail in U.S. Pat. No. 5,627,359, which patent is commonly owned by Metrologic Instruments, Inc. and incorporated herein by reference.

In the example of FIG. 1, movable bracket 1005 includes a position adjustment mechanism providing position adjustment of the housing 1007 relative to the bracket 1005 about rotational axis a–a'. This position adjustment mechanism is provided in the form of an annular flange 1009 having an inner diameter 1011 and an outer diameter 1013. Along the interior (inner) surface of annular flange 1009, between inner and outer diameters 1011 and 1013, are provided one or more projections, notches, ridges, grooves, nubs, fingers, detents, and/or bosses that engage one or more corresponding mating structures (such as projections, notches, ridges, grooves, nubs, fingers, detents, and/or bosses) on housing 1007, as will be described in greater detail with reference to FIG. 2.

Figure 2:
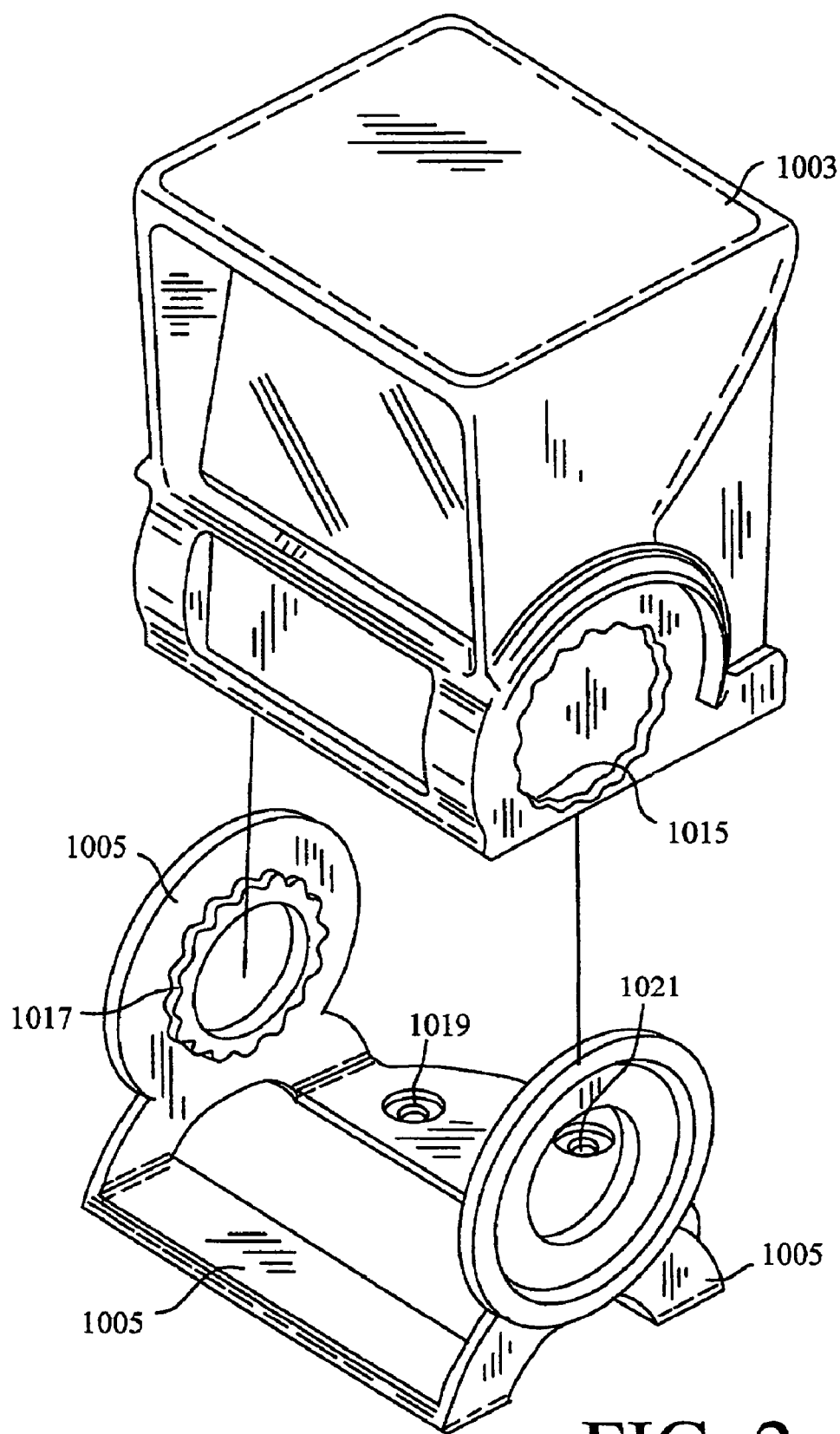
FIG. 2 is an exploded perspective view of the bar code scanner housing of FIG. 1 showing the scanner housing about to be placed into the movable bracket.

FIG. 2 is an exploded perspective view of the bar code scanner housing of FIG. 1 showing scanner housing 1007 about to be mounted to movable bracket 1005. Attention is directed to annular flange 1009. Along the interior (inner) surface of annular flange 1009, between inner and outer diameters 1011 and 1013, are provided one or more projections 1017 (in this example, rounded teeth), that engage one or more corresponding mating structures (in this example, rounded grooves 1015) of housing 1007. Also, observe that movable bracket 1005 includes two mounting holes 1019, 1021 for mounting to a surface such as a countertop and/or point of sale terminal.

Figure 3:
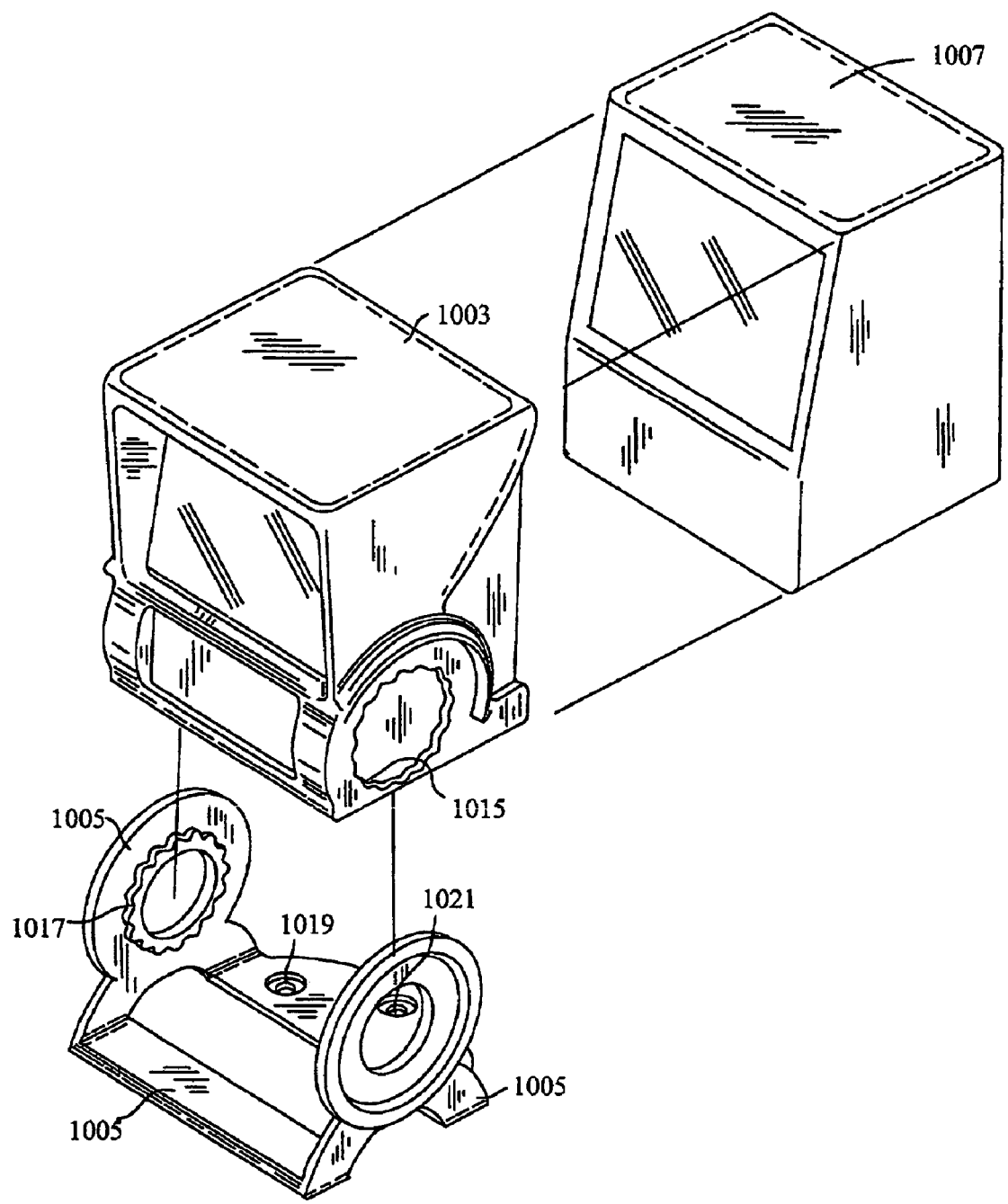
FIG. 3 is an exploded perspective view of the bar code scanner housing of FIG. 1 showing an encasement fabricated of shock-absorbing material about to be applied to the scanner housing.

FIG. 3 is an exploded perspective view of the bar code scanner housing of FIG. 1 showing a protective sheath 1003 about to be applied to scanner housing 1007. In the example of FIG. 3, this protective sheath 1003 is a removable and reinstallable encasement fabricated of a shock-absorbing material such as rubber.

Figure 4:
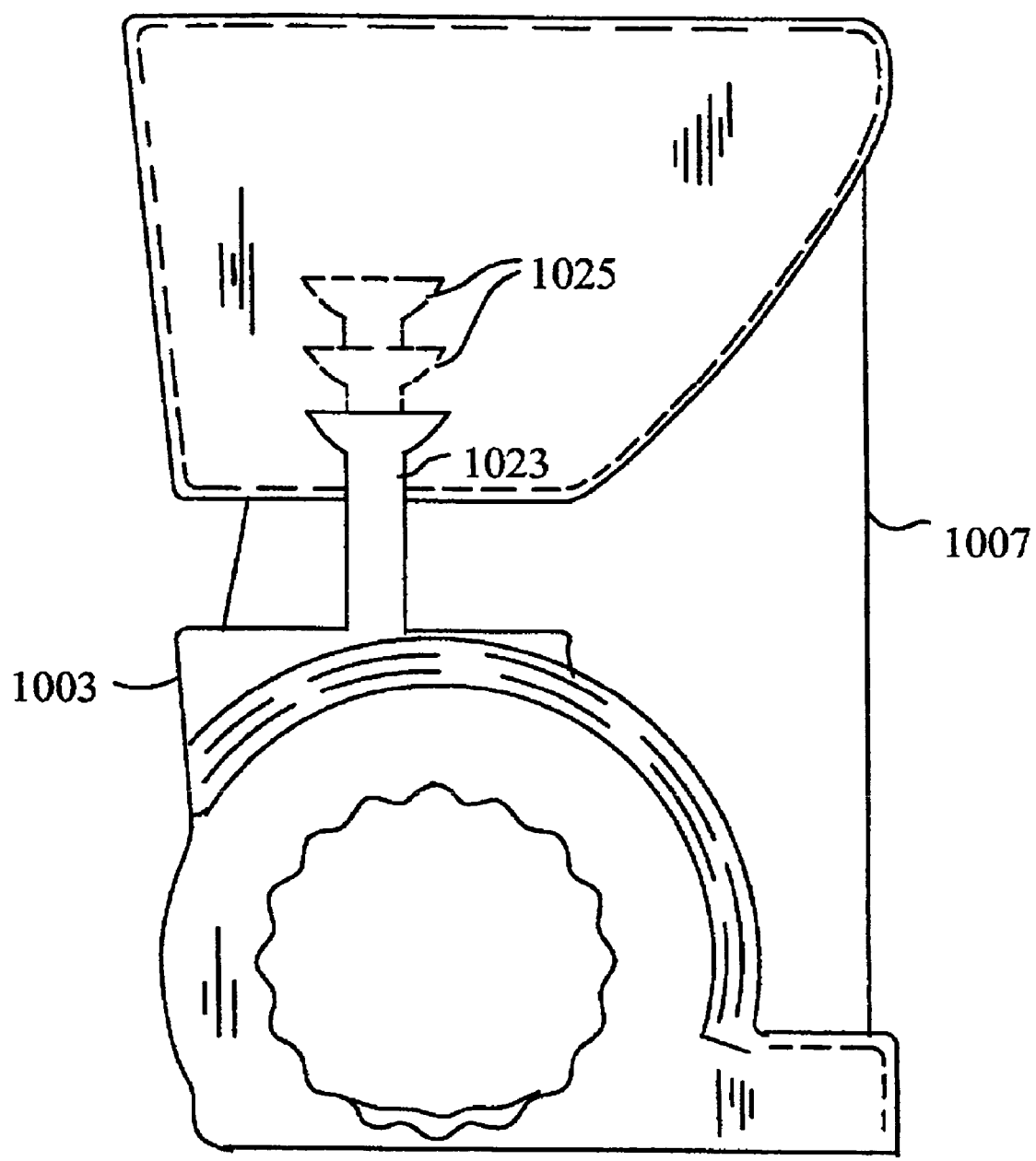
FIG. 4 is a side view of the bar code scanner housing of FIG. 3 wherein the encasement includes one or more notched projections so as to facilitate removal and/or installation of the encasement on the scanner housing.

FIG. 4 is a side view of the bar code scanner housing of FIG. 3 wherein protective sheath 1003 includes one or more projections 1023 and mating notches 1025 so as to facilitate quick and easy removal and/or installation of protective sheath 1003 on housing 1007. Use of these projections 1023 and notches 1025 is optional. The protective sheath 1003 shown in FIGS. 1-3 can be removed and reinstalled from housing 1007 without the use of any projections or notches.

Figure 5:
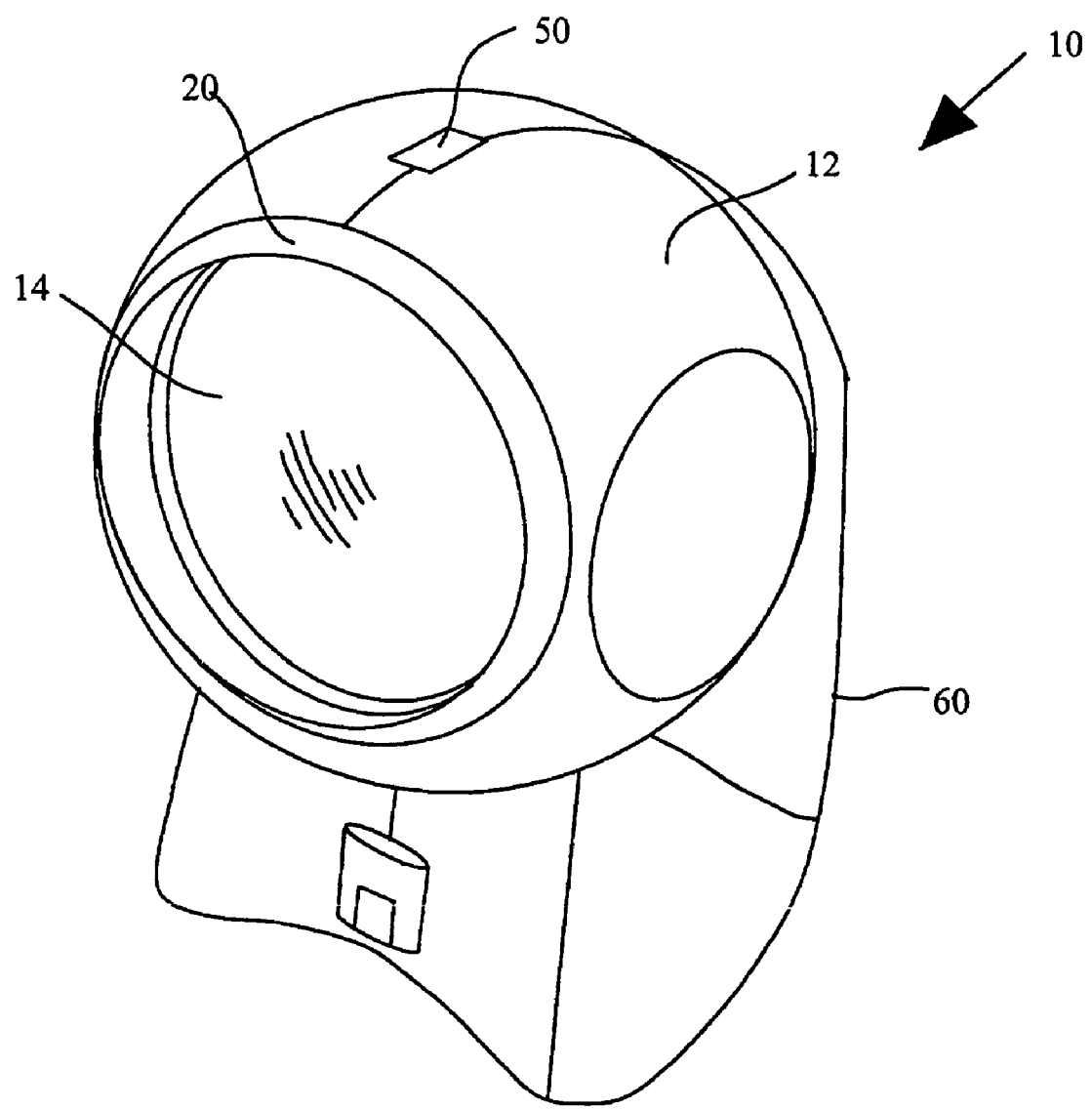
FIG. 5 is a perspective view of a multi-purpose bar code scanner that is hand-supportable, free-standing, and/or mountable, wherein the housing is configured according to a second embodiment of the invention and includes a substantially omnidirectional laser scanning platform mounted therein.

Refer now to FIG. 5, which is a perspective view of a multi-purpose bar code scanner 10 that is hand-supportable, free-standing, and/or mountable. The scanner includes a housing that is configured according to a second embodiment of the invention and has a substantially omnidirectional laser scanning platform mounted therein. Scanner 10 includes a scanning head 12 that is rotationally connected to a base unit 60. Scanning head 12 houses various associated optical components of the omnidirectional laser scanning platform as will be described in greater detail hereinafter.

Figure 6:
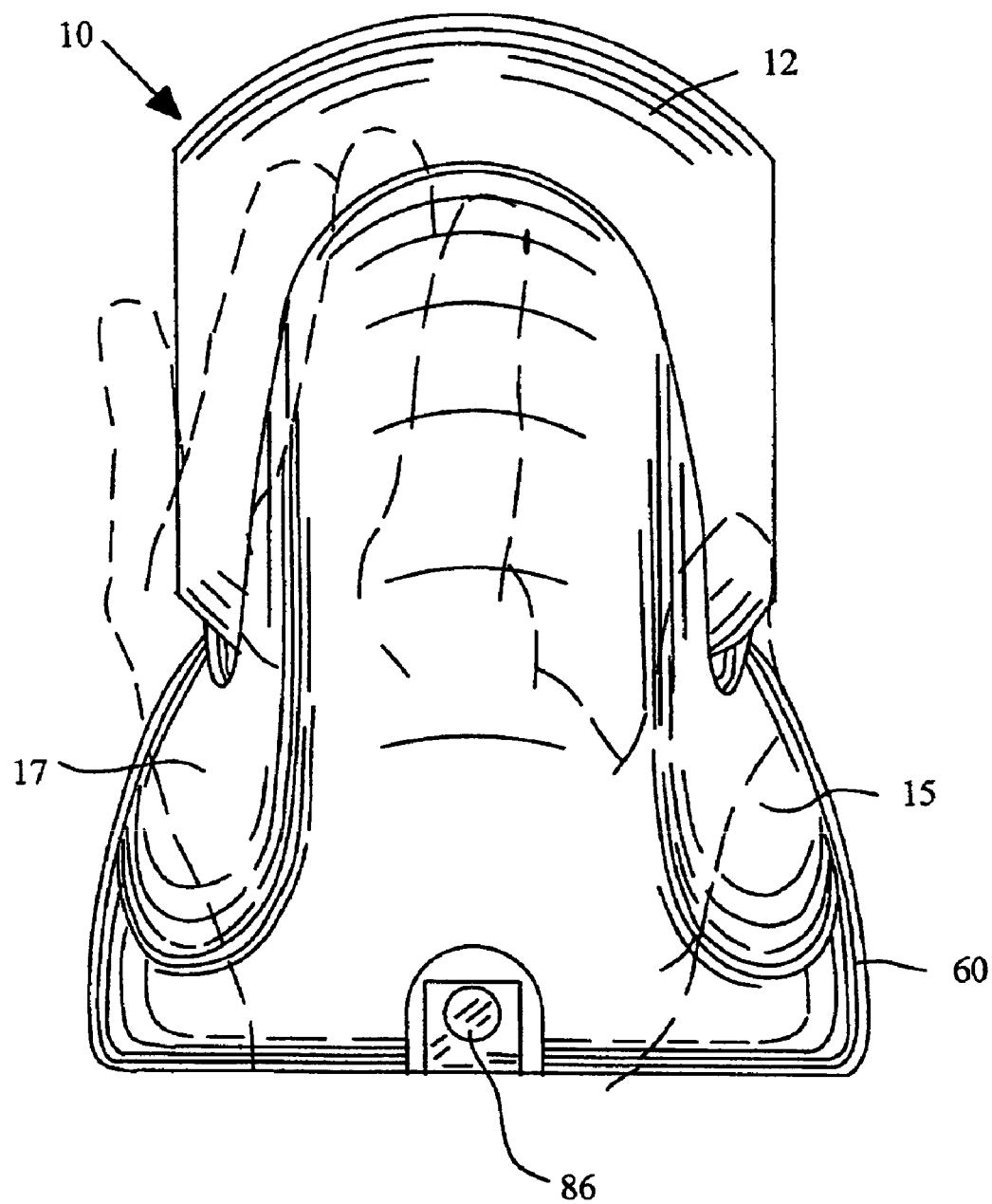
FIG. 6 is a rear view of the bar code scanner of FIG. 5.
Figure 7:
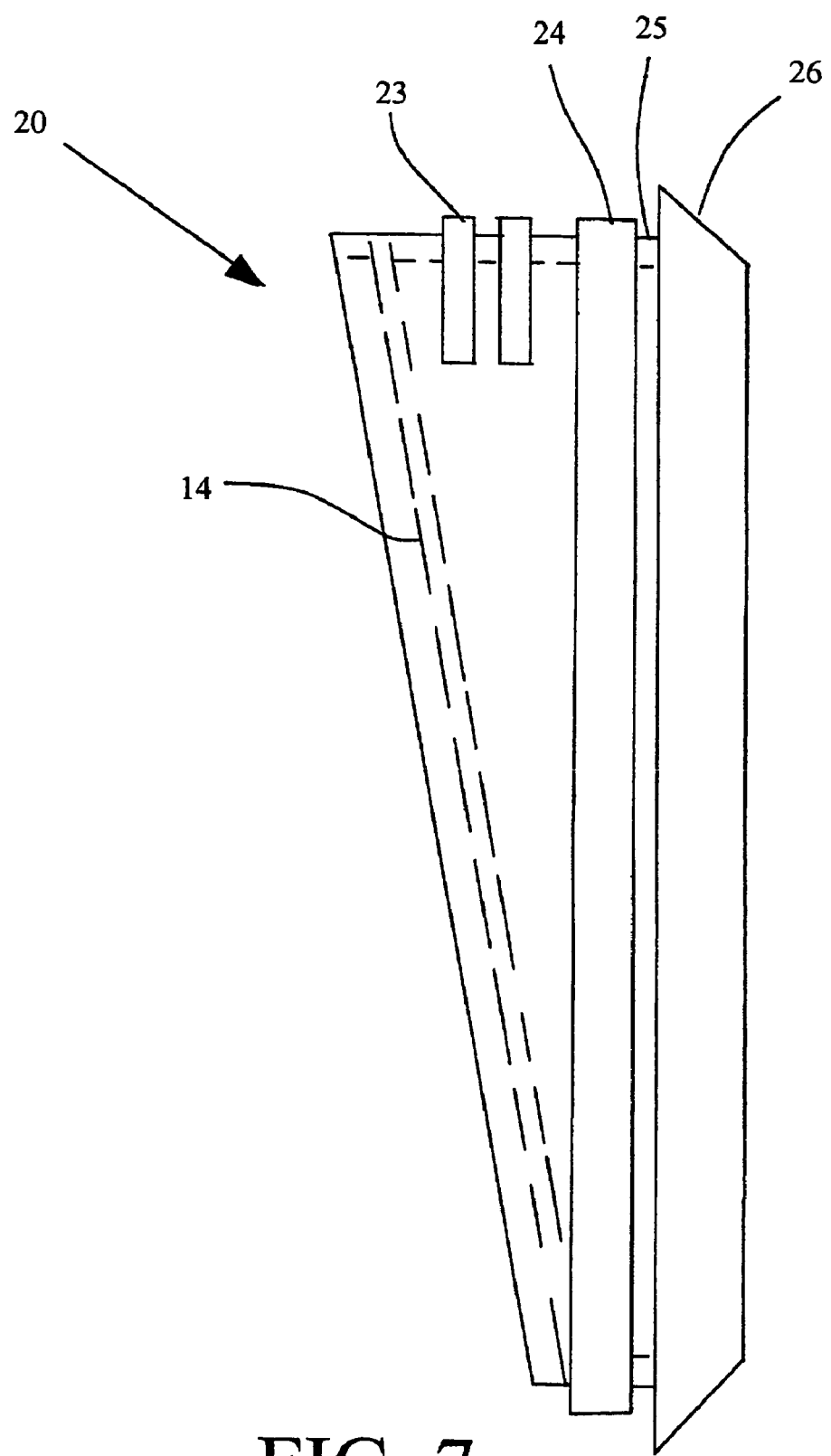
FIG. 7 is a side view of a circular housing bumper which may be used in conjunction with the bar code scanner of FIG. 5.

FIGS. 5 through 8 set forth the general construction of the scanner housing. Scanning head 12 has an aperture 11 through which a substantially omnidirectional scanning pattern is projected. Scanning head 12 is formed in a generally spherical configuration with a flat front window 14 and top-mounted LED power and good read indicator 50. Head unit 12 is preferably molded of hard plastic or the like, and can be formed in two half-sections with tongue-and-groove edges for an interlocking fit. Scanning window 14 is generally round in configuration and mounted in a circular housing bumper 20, which is in turn mounted in aperture 11 of scanning head 12. As shown in FIG. 7, window 14 is seated at an angle within a groove (not shown) formed in housing bumper 20.

Housing bumper 20 has a beveled outer lip 26 and an inner lip 24 with a channel 25 formed therebetween. Channel 25 engages the inner edge of the aperture 11 of the scanning head 12. Additionally, the housing bumper has a pair of locking rib members 23 which further engage a corresponding protrusion 21 on the interior of scanning head 12 (refer to FIG. 10). The combination of channel 25 and locking rib members 23 acts to secure the window 14 and the housing bumper 20 to the scanner housing 10. Housing bumper 20 acts to protect the front of the scanner head 12 and to cushion the scanning window 14 against damage if the unit dropped or banged. Window 14 is a round section of transparent acrylic-type plastic with optical filtering properties such as described in detail in U.S. Pat. No. 5,627,359, which patent is commonly owned by Metrologic Instruments, Inc. and incorporated herein by reference. The size and shape of the scanning window and housing bumper can be varied from the specific size and/or shape shown without changing the performance of the scanner.

Figure 8:
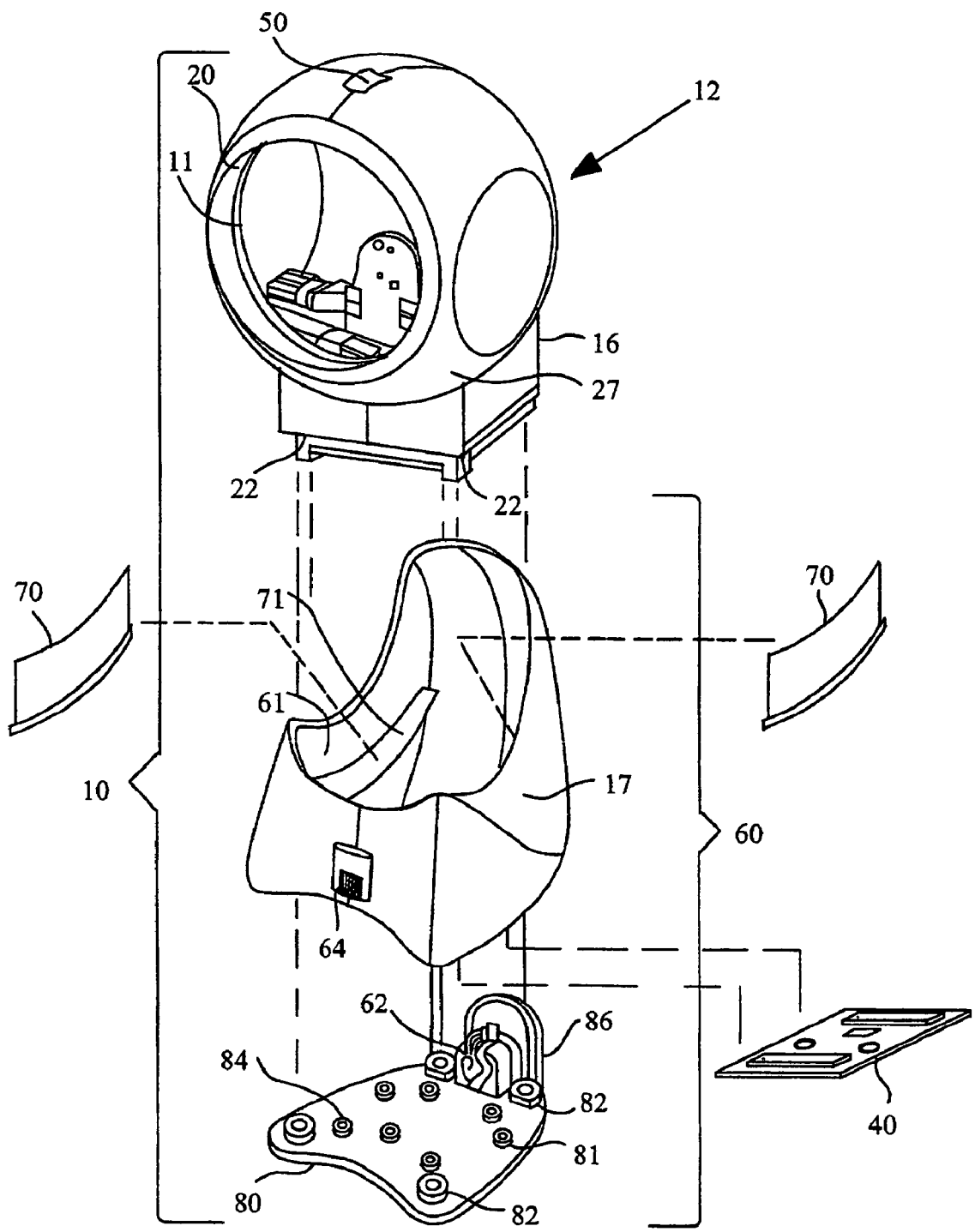
FIG. 8 is an exploded perspective view of the bar code scanner of FIG. 5.

FIG. 6 is a rear view and FIG. 8 is an exploded view of the scanner 10 of FIG. 5 in which the enhanced ergonomics of the design are apparent. Base unit 60 has a contoured top opening 61 for receiving a neck portion 16 of the substantially spherical scanning head 12. The contour of the opening 61 is curved upward to provide ergonomic support for the spherical scanning head 12 and an aesthetically pleasing scanner 10 (as was shown and claimed in Applicant's corresponding U.S. Design Pat. No. D 408,806). The bottom portion of base unit 60 has contoured lateral recesses 15 and 17 on opposing sides to provide thumb and finger grips as shown in FIG. 6. During hand-supported operation of scanner 10, the user can easily grip scanner 10 in one hand by the contoured lateral recesses 15 and 17 and lift it off of a countertop surface to scan a large or bulky item.

FIG. 8 details the component parts of the scanner housing and their assembly into scanner 10. As shown, neck portion 16 of scanning head 12 is inserted into the contoured opening 61 in base unit 60. Base unit 60 rotationally supports head unit 12 and houses a printed circuit board ("PC board") which includes electronics for implementing functions related to the digitizing, decoding, formatting and transmitting of bar code symbol character data produced in scanning head 12. If some of these electronic elements are not mounted in scanning head 12, these circuit elements can be located on an optional PC board mounted in base unit 60. Scanning head 12 can be pivoted about a horizontal axis with respect to base 60, thereby allowing a user to position scanning window 14, and the projected scan pattern, along any of a plurality of directions.

Neck portion 16 of scanning head 12, once inserted into base unit 60, rests atop two opposing guide-rails 70 mounted on the interior side walls of base unit 60. Guide rails 70 snap fit onto correspondingly-shaped protrusions 71 formed in interior side walls of base unit 60. Guide rails 70 are formed of smooth plastic and provide direct support and cushioning for scanning head 12. The underside of neck 16 has a pair of arcuate indentations 22 on opposite sides of the neck. Guide rails 70 are curved to conform to indentations 22 on the underside of neck 16 and in general to the spherical outer surface of scanning head 12.

Figure 24:
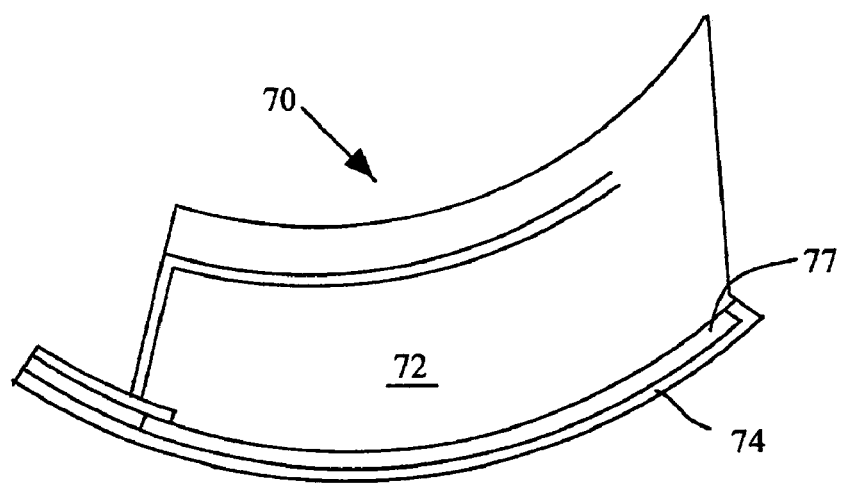
FIG. 24 is a side view of the slide rail shown in FIG. 9.
Figure 25:
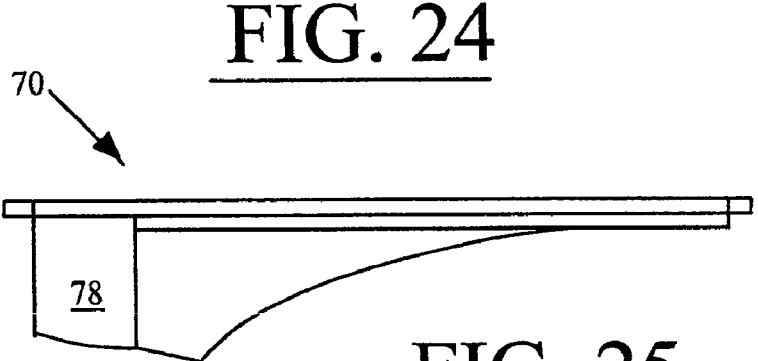
FIG. 25 is a top view of the slide rail shown in FIG. 24.
Figure 26:
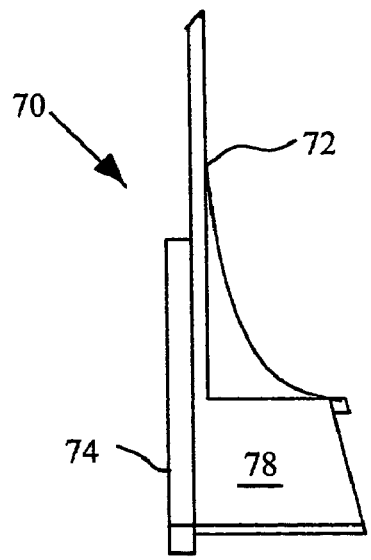
FIG. 26 is a front view of the slide rail 70 shown in FIGS. 24 and 25.

FIGS. 24, 25 and 26 are a side view, top view and front view, respectively, of the right-side guide rail 70 which is exemplary of both guide rails. Guide rail 70 is an arcuate bracket that snap fits onto a correspondingly-curved protrusion 71 formed on the interior side walls of scanning head 12 via a groove 77 formed along bottom edge of guide rail. Each guide rail 70 has a planar side-wail portion 72, a front spacer bracket 78, a reinforcing rib 76, and an arcuate slide rail 74 protruding laterally from bottom edge of each sidewall portion 72. Slide rail 74 is exterior of groove 77. Once groove 77 has been fitted to protrusion 71, slide rail 74 extends into the center of base unit 60.

When guide rails 70 are attached to the interior of base unit 60, opposite each other, they provide slidable support for neck portion 16 and the scanning head. Indentations 22 formed in the side of neck portion 16 rest on slide rails 74. The exterior spherical surface 27 of scanning head 12 rests on the upper edge of side-wall portion 72 of guide rails 70. When scanning head 12 is rotated about a horizontal axis, indentations 22 in neck 16 slide against slide rails 74 of guide rails 70. The front spacer bracket 78 and reinforcing rib 76 further act to support, position and cushion scanning head 12 on base unit 60.

Figure 9:
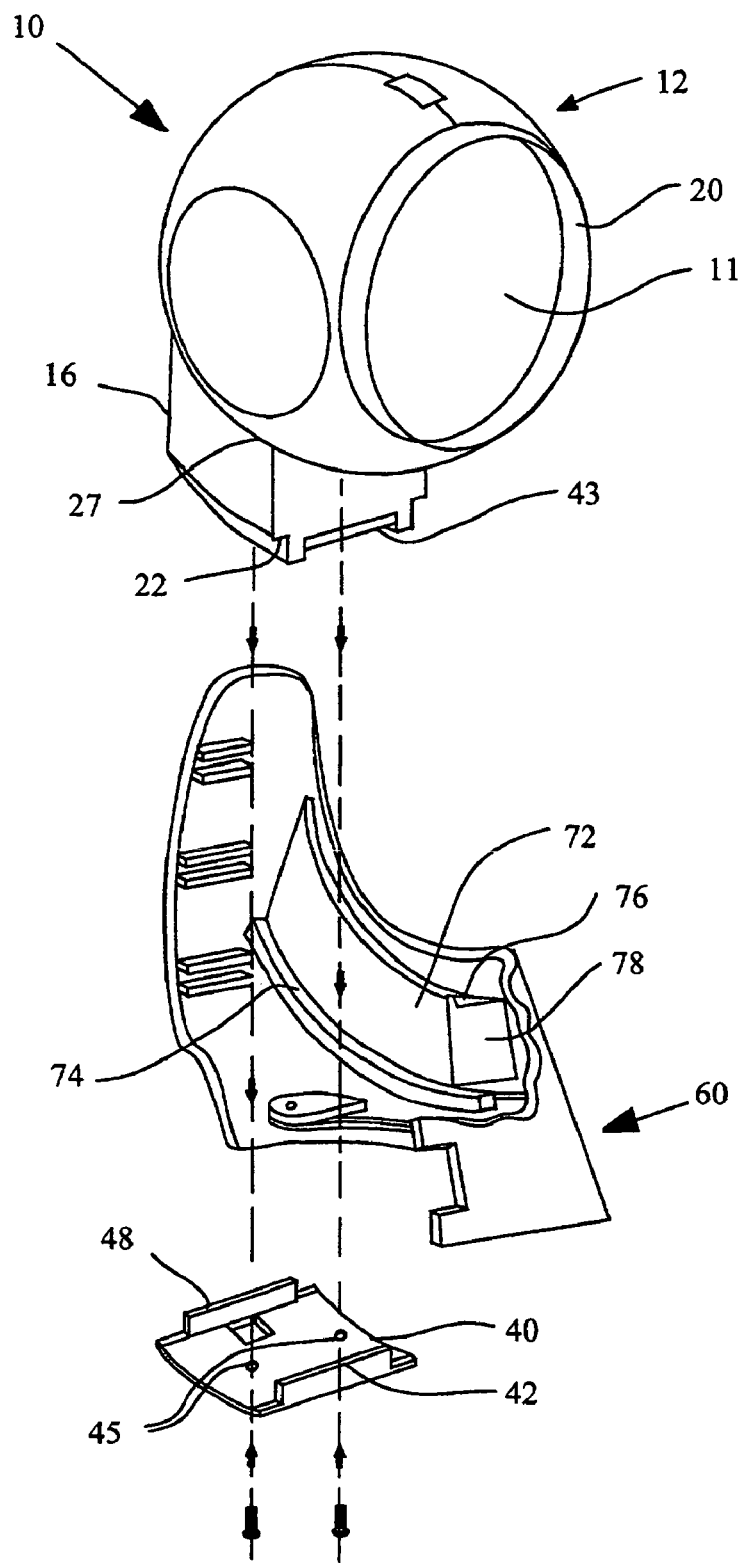
FIG. 9 is an exploded perspective view of the bar code scanner of FIG. 5 showing a cross-sectional view of an illustrative base unit.

With reference to FIGS. 8 and 9, a guide plate 40 attaches to the underside of neck portion 16, and guide plate 40 traverses opposing guide rails 70 to moveably connect scanning head 12 to base unit 60, thereby pivotally securing scanning head 12 to base unit 60.

Figure 22:
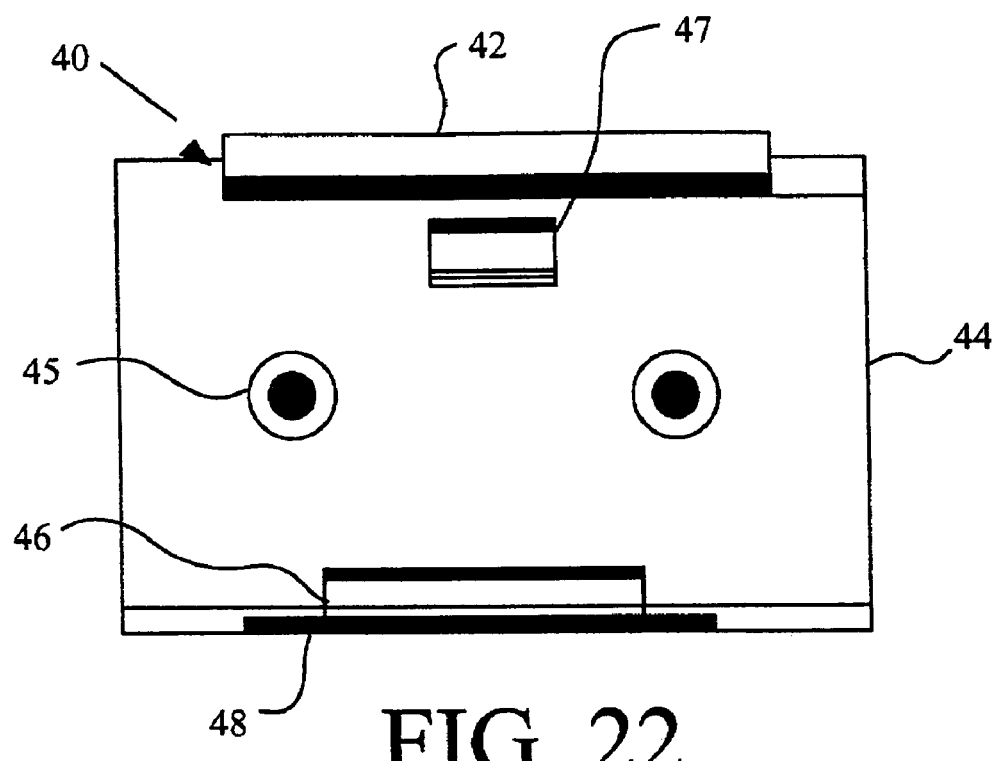
FIG. 22 is a top view of the guide plate shown in FIGS. 8 and 9.
Figure 23:
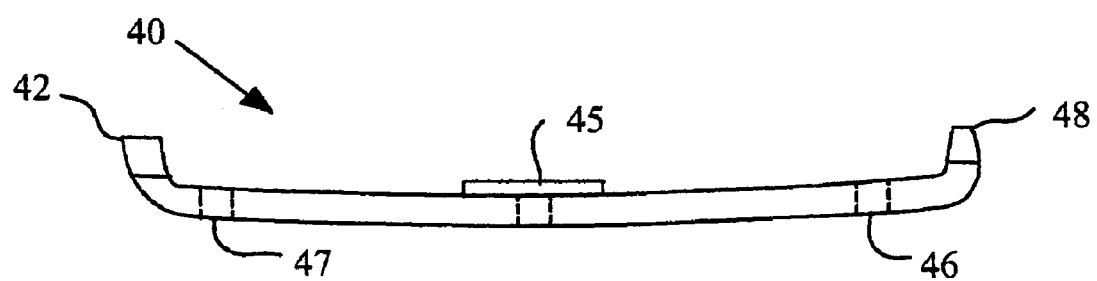
FIG. 23 is a side view of the guide plate of FIG. 22.

FIGS. 22 and 23 are a top view and a side view, respectively, of guide plate 40. Although guide plate 40 is shown in FIGS. 8 and 9 as intended for use with the scanner of FIG. 5, a guide plate 40 may also be used in conjunction with the scanner of FIG. 1. Guide plate 40 is a substantially rectangular panel that has a pair of parallel tabs 42 and 48, front and back, that fit within corresponding notches 43 on the underside of neck 16 to position guide plate 40, and two screw holes 45 to facilitate screw attachment to neck 16. Openings 46 and 47 allow for the pass through of electrical connections.

With respect to the scanner of FIG. 5, during rotation of scanning head 12, guide plate 40 similarly slides against underside of slide rails 74 identical to the movement of the underside of neck 16 against the top side of slide rails 74. When neck 16 is seated on seated on guide rails 70, indentations 22 rest against slide rails 74 and the neck fits snugly between guide rails 70. During rotation of the scanning head, guide rails 70 provide both lateral and elevational support for scanning head 12. This support by guide rails 70 prevents the outside of scanning head 12 from constantly brushing against the curved opening 61 of base unit 60, which in turn keeps the outside surface of scanning head 12 from being scratched by the repetitive motion of rotating head 12 with respect to base unit 60.

Figure 14:
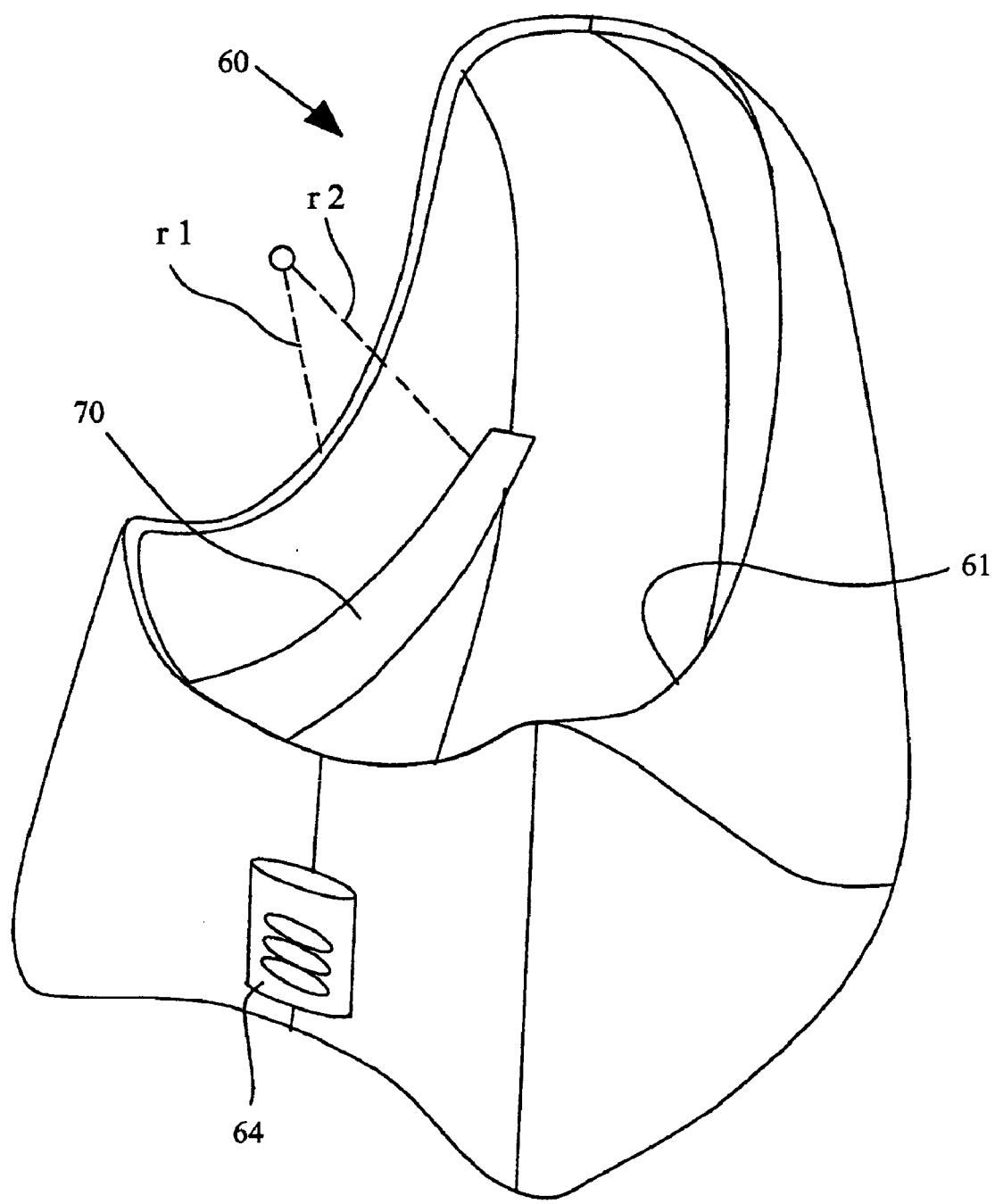
FIG. 14 is a perspective view of an illustrative base unit into which the bar code scanner of FIG. 5 may be mounted.

FIG. 14 is a perspective view of base unit 60 with guide rails 70 installed therein. Note that this base unit 60 is used in conjunction with the scanner of FIG. 5, and not with the scanner of FIG. 1. The curved configuration of guide rails 70 and opening 61 provides a first pivot point of radius r1 extending from contoured opening 61 of base unit 60 about the horizontal axis of head unit 12, and a second pivot point of radius r2 extending from guide rails 70 to the same horizontal axis of head unit 12. This dual-radius orbiting support configuration results in an extremely rugged and durable scanning unit in which scanning head 12 pivots easily about a horizontal axis with little or no friction against base unit 12. When used as a fixed scanner, base unit 60 provides a well-balanced, stable and protected foundation for head unit 12, and yet very little counter space is needed.

Returning to FIG. 8, a bottom plate 80 is a substantially planar member that attaches to the underside of base unit 60 by four screws through screw holes 82, thereby sealing it off. Rubber feet can be secured to the underside of bottom plate 80 to cover the screw heads and to improve the footing of the scanner. Additional screw holes 84 may be provided as desired to allow for mounting the scanner in a fixed manner to a countertop, wall or other fixed position. Preferably, a collar 86 protrudes upwardly from bottom plate 80 and fits into an opening provided in base unit 60. Collar 86 has an opening 62 for the insertion of a power or communication cable. Bottom plate 80 and collar 86 are configured to fit flush with the bottom of base unit 60 with the collar 86 fitting snugly into opening 62. This configuration aids assembly and reinforces collar 86 to provide a rugged passage for electrical cabling. The bottom plate 80 additionally provides support for an optional second PC board (not shown) which holds circuitry for any of the digitizing, decoding, formatting and transmitting of bar code symbol character data. Cabling also connects an analog signal processing board 52 (to be described) that is mounted in scanner head 12 to a signal decoding board in base unit 60. The cables are passed through openings formed in neck portion 16 of scanning head 12 and guide plate 40.

The compact scanner housing configurations set forth in FIGS. 1 and 5 yield convenient, durable and ergonomic scanner packages having scanning heads 12 that can be tilted vertically about a 30 degree angle with respect to base unit 60, and/or a fixed surface such as a countertop. Thus, these scanners are structurally capable of implementing a relatively aggressive omnidirectional scanning pattern from a free-standing fixed position atop a counter, from a fixed mounting position at a point of sale terminal, or while handheld by a user. The flexibility of the housing as described above is matched by an aggressive and reliable omnidirectional laser scanning platform. The same omnidirectional scanning platform could, but need not, be employed in the bar code scanner designs of FIGS. 1 and 5. The scanning platform, inclusive of all associated optical and electrical components, is mounted within the head unit 12 and projects a pattern of scan lines through front window 14 onto a bar code to be read.

Figure 30:
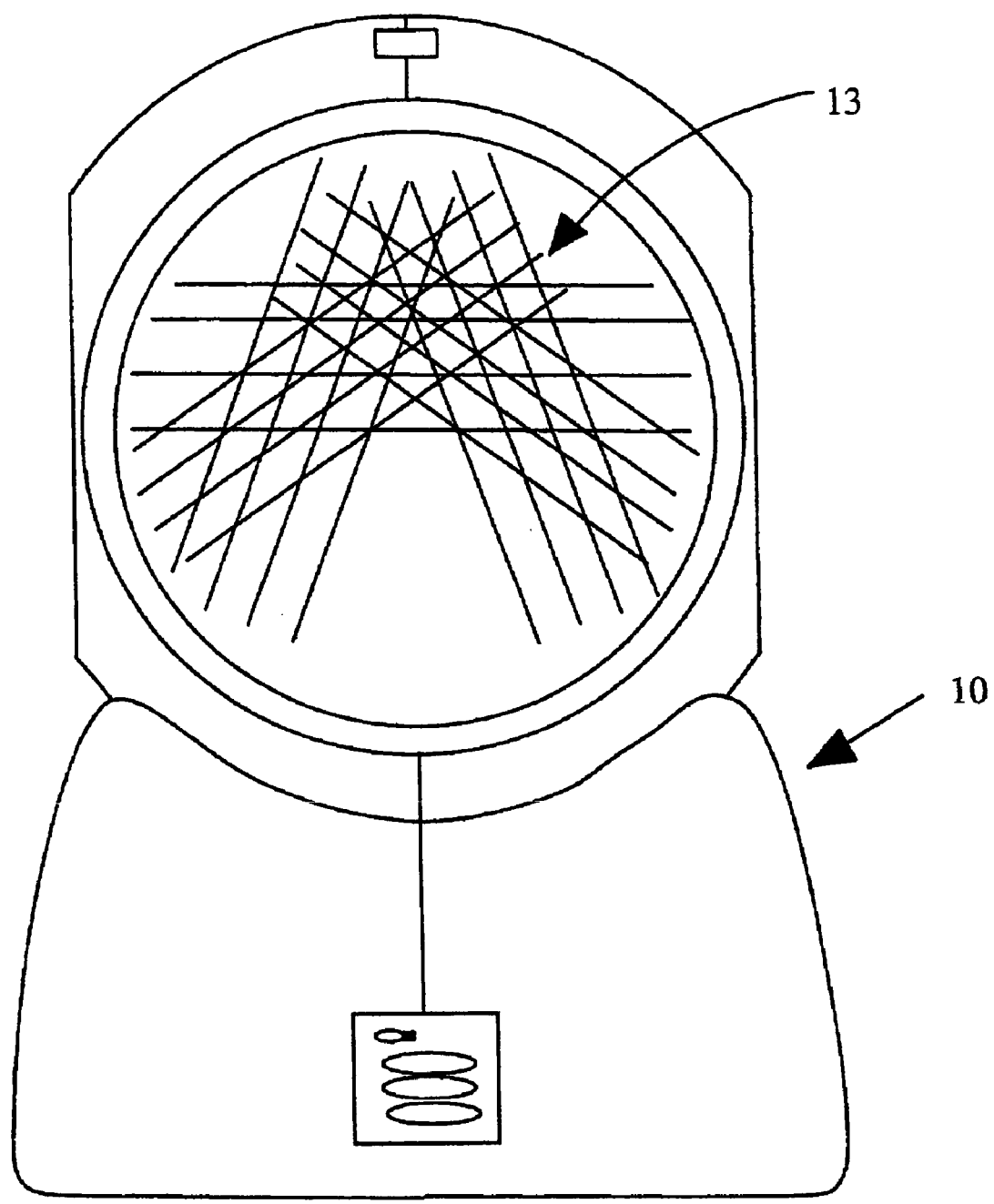
FIG. 30 is a front view of the scanner of FIG. 5 showing the omnidirectional scanning pattern at the face of the unit.
Figure 31:
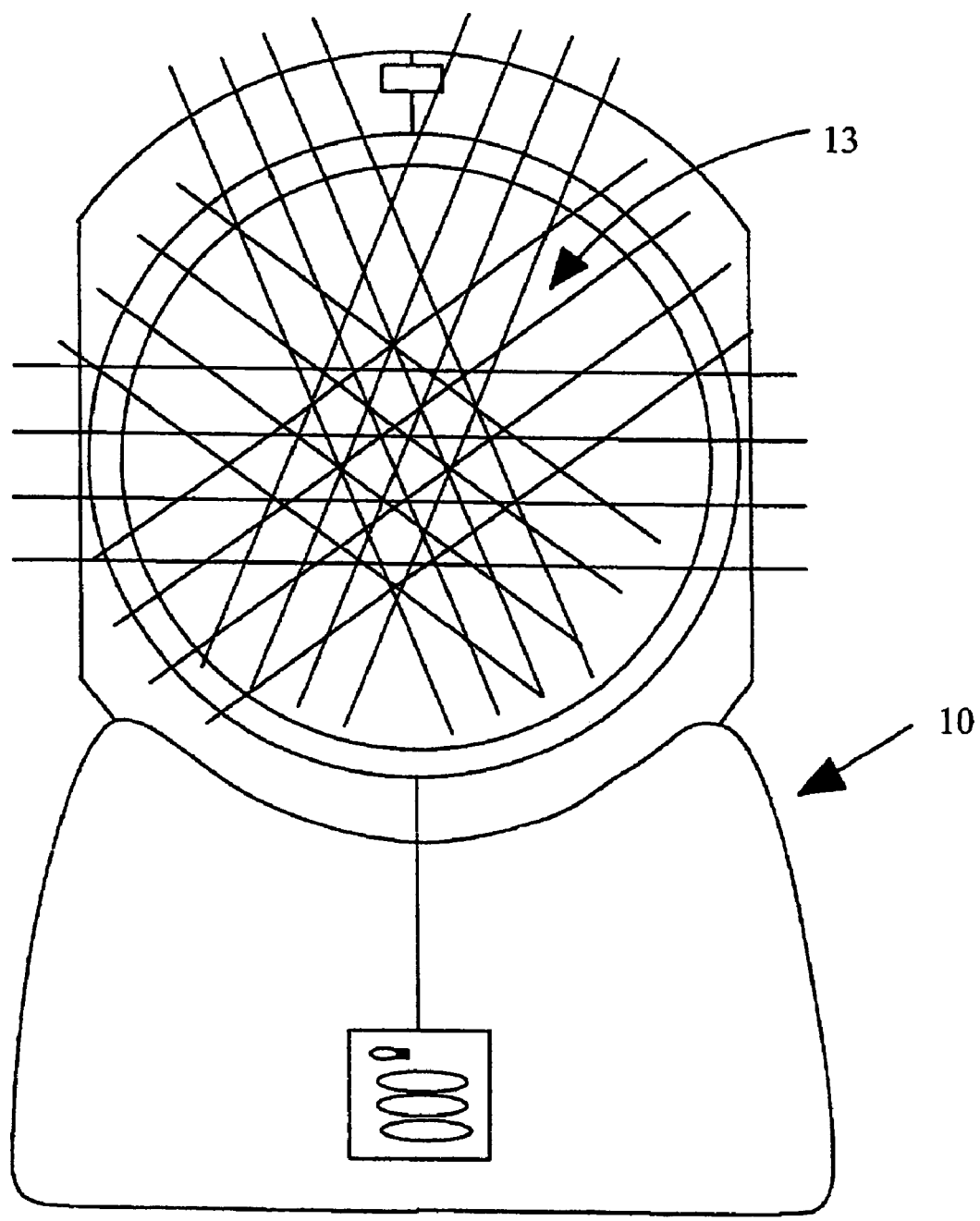
FIG. 31 is a front view of the scanner of FIG. 5 showing the omnidirectional scanning pattern at approximately 2.5 inches away from the face of the unit.

FIGS. 30 and 31 show the omnidirectional scanning pattern as it is projected at the light transmission window and 2.5 inches from the window of the bar code scanner of FIG. 1. A substantially similar pattern is projected by the scanner of FIG. 5, but the window of FIGS. 30 and 31 would then be shown as rectangular or square instead of circular. The omnidirectional laser scanning platform of the present invention may employ an optical layout that is substantially similar to any of the optical layouts shown in U.S. Pat. Nos. 5,637,852 and 5,844,227, the entire disclosures of which are incorporated by reference herein.

Figure 10:
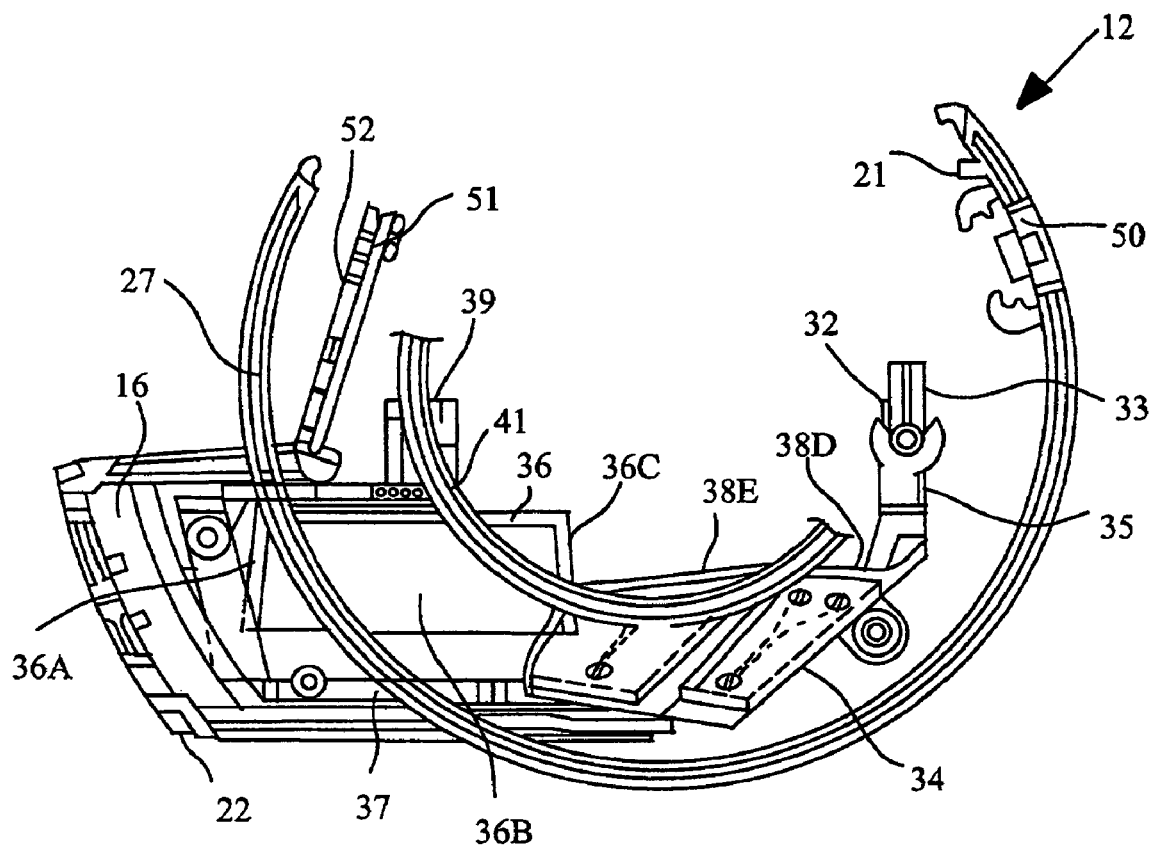
FIG. 10 is a side cross-sectional view of the scanning head of the bar code scanner of FIG. 5 showing the configuration of various optical components mounted therein.
Figure 11:
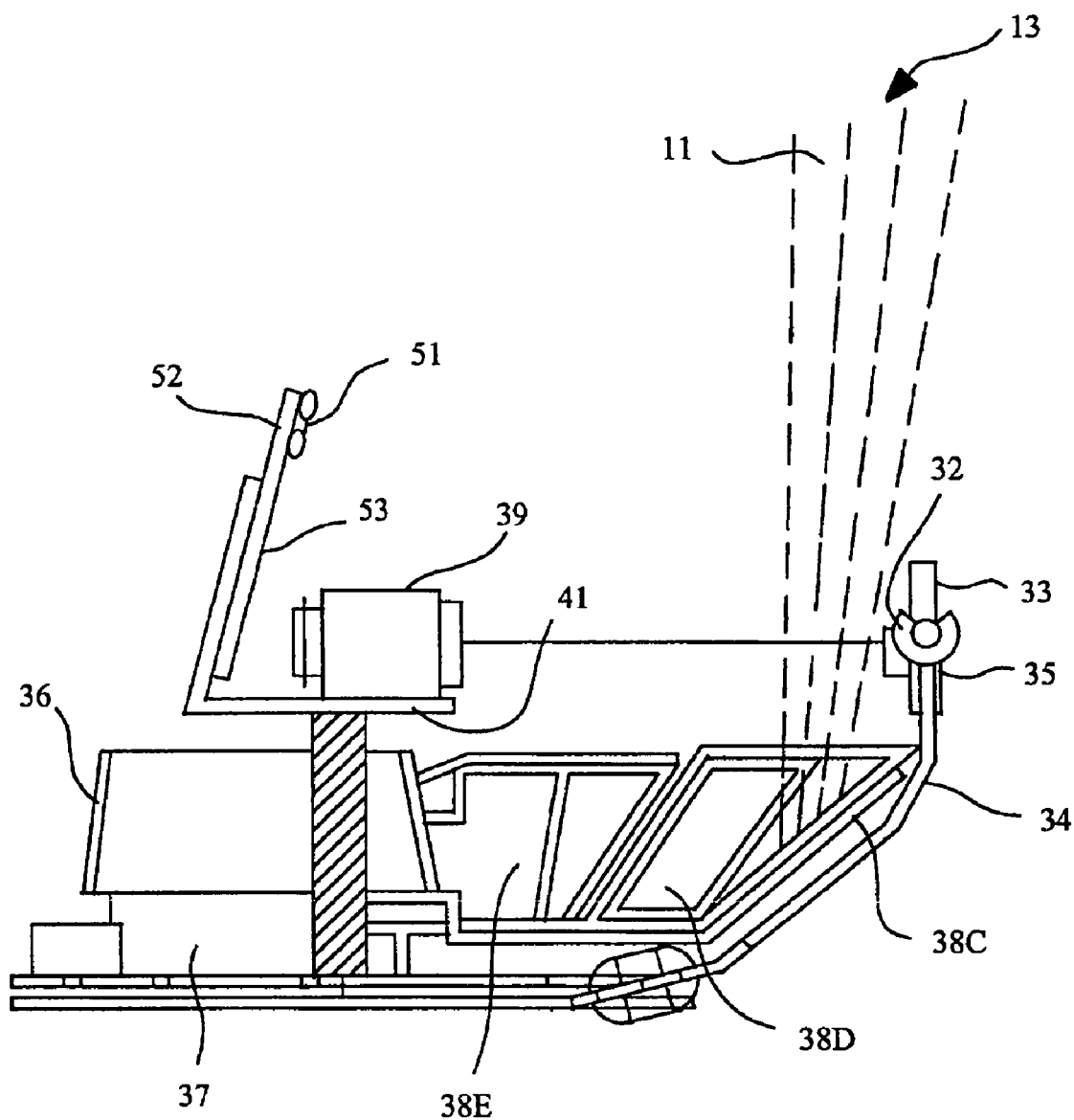
FIG. 11 is side view of a substantially omnidirectional laser scanning platform which may be mounted within the housing of the bar code scanner of FIG. 1 and/or the housing of the bar code scanner of FIG. 5.
Figure 12:
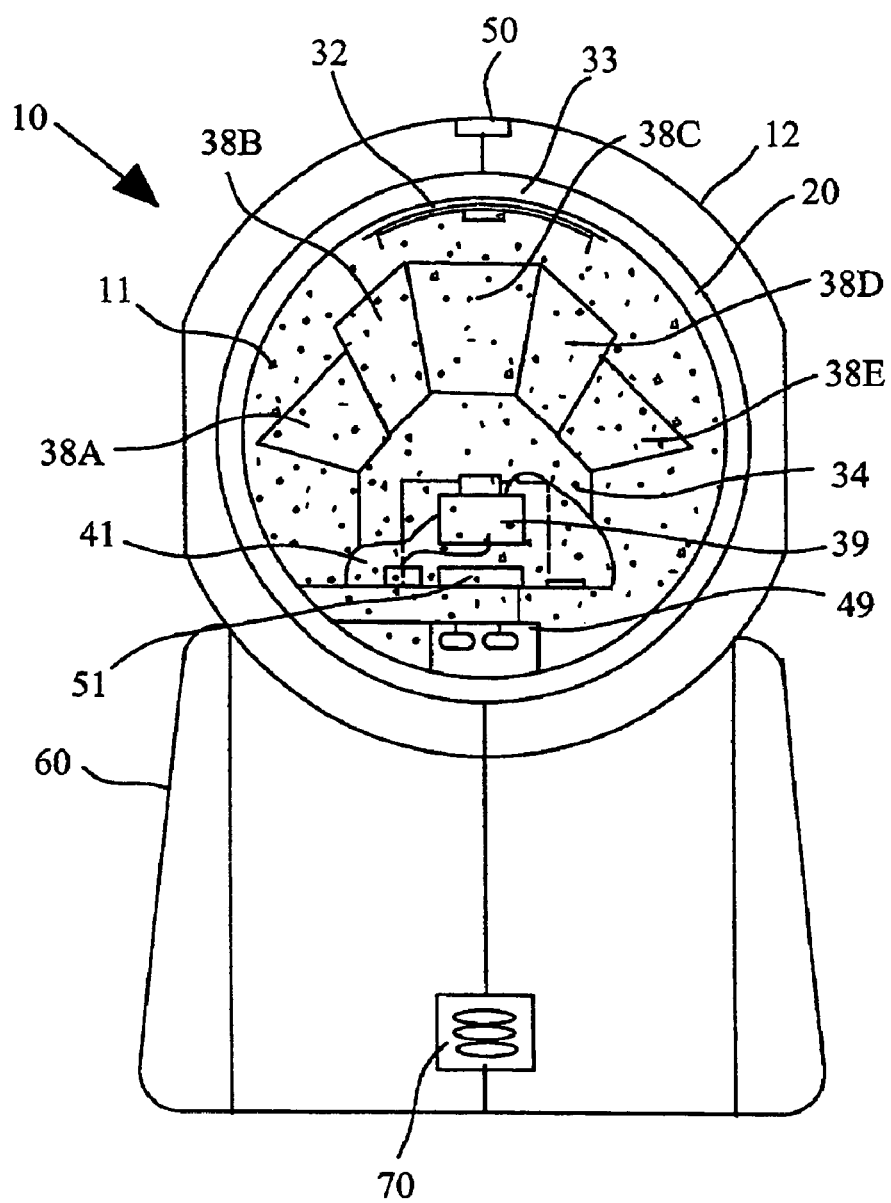
FIG. 12 is a front view of the bar code scanner of FIG. 5 showing a first illustrative layout for various optical components mounted therein.
Figure 13:
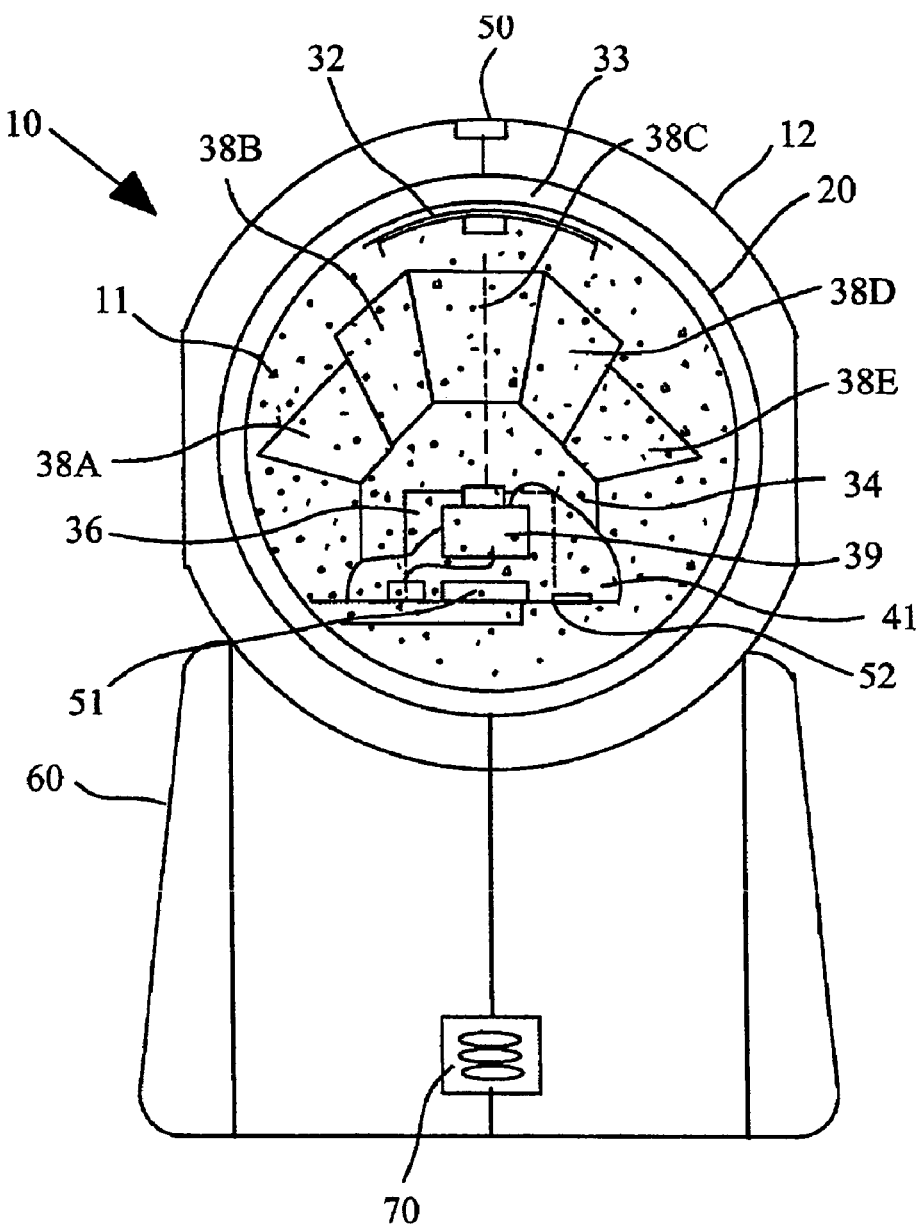
FIG. 13 is a front view of the bar code scanner of FIG. 5 showing a second illustrative layout for various optical components mounted therein.

As shown in FIGS. 10–12 and 15–18, an exemplary laser scanning platform according to the present invention may be mounted within housing 1007 of bar code scanner 1001 of FIG. 1, and/or head portion 12 of scanner housing 10 of FIG. 5. With reference to FIGS. 10–12, showing the laser scanning platform mounted in the scanner of FIG. 5, the platform includes subcomponents assembled upon an optical bench 34 with respect to a central longitudinal reference plane. Substantially identical components are used in the scanning platform that is mounted within the scanner of FIG. 1, except that these components would be mounted to the interior of an enclosure having a cubic volume instead of a spherical volume. As shown in FIG. 10, the subcomponents assembly includes: a scanning polygon 36 having four light reflective surfaces 36A, 36B, 36C and 36D, each disposed at a tilt angle with respect to the rotational axis of the polygon; an electrical motor 37 mounted on the optical bench and having a rotatable shaft on which polygon 36 is mounted for rotational movement therewith; an array of stationary mirrors 38A, 38B, 38C, 38D and 38E fixedly mounted with respect to the optical bench; a laser beam production module 39, fixedly mounted above the rotating polygon 36 for producing a laser beam having a circularized beam cross-section, and essentially free of astigmatism along its length of propagation; an analog signal processing board 52 fixedly over the rotatable polygon 36 and carrying a photodetector 51 for detecting reflected laser light and producing an analog signal, and signal processing control circuits 53 for performing various functions, including analog scan data signal processing; a light collecting mirror 33, disposed above the array of stationary mirrors 38 for collecting light rays reflected off the rotating polygon 36 and for focusing these light rays onto the photodetector 51 on the analog signal processing board 52; and a beam directing surface 32, realized as a flat mirror mounted on the light collecting mirror for directing the laser beam from the laser beam production module 39 to the rotating polygon 36 disposed there beneath.

The laser beam production module of the present invention could be implemented by employing a system of a lens and aperture as is well known in the art, a system which employs a plurality of diffractive optical elements (DOEs) for modifying the size and shape of the laser beam. Various embodiments of DOE-based laser beam production modules are shown and described in co-pending patent application Ser. No. 09/071,512 filed on May 1, 1998, commonly owned by the applicant hereof and incorporated by reference herein.

Figure 27:
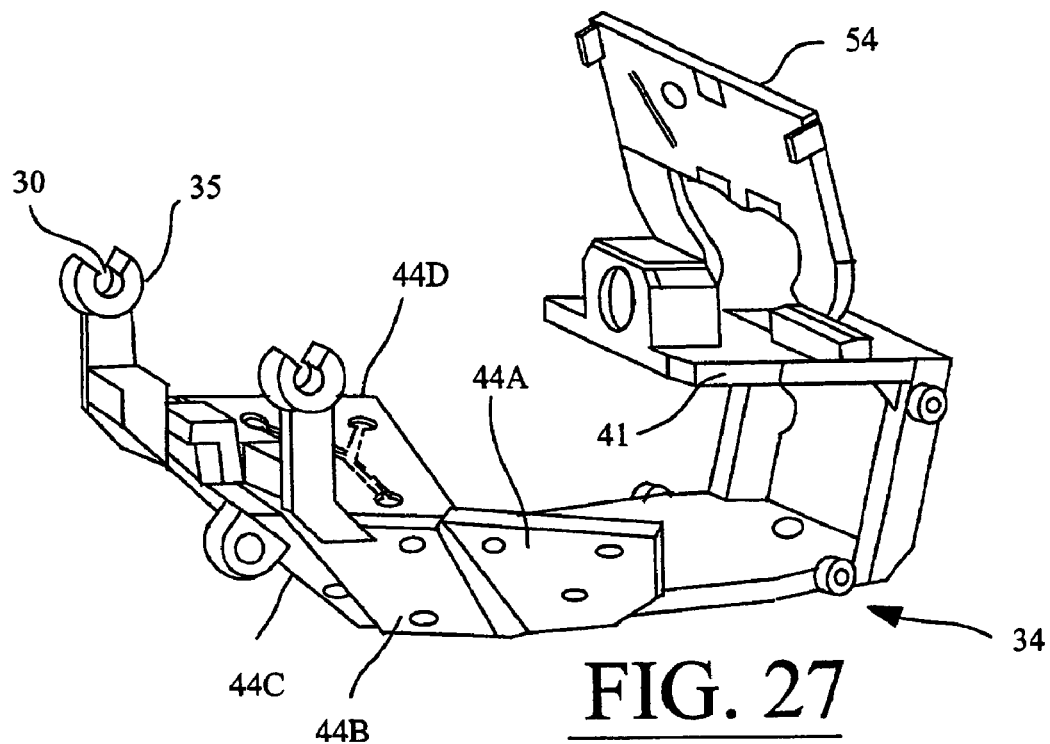
FIG. 27 is a perspective view of the optical bench of FIGS. 10 and 11 stripped of optical components.
Figure 28:
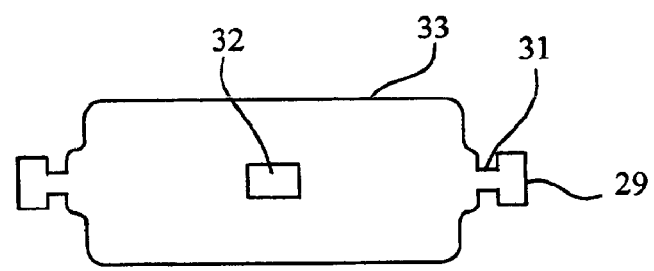
FIG. 28 is a top view of the light collecting mirror shown in FIG. 10.
Figure 29:
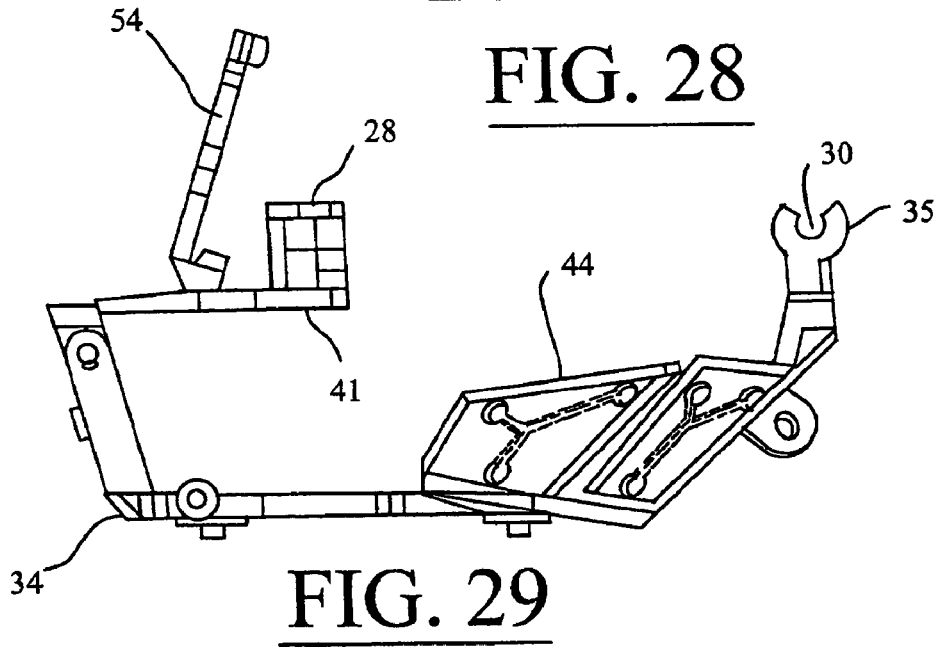
FIG. 29 is a side view of the optical bench of FIGS. 10 and 11.

With reference to FIGS. 27, 28 and 29, the optical bench 34 is shown in greater detail, with the polygon 36, scanning motor 37, laser beam production module 39, collector mirror 33, and stationary mirror elements 38A through 38E removed for illustration purposes. As shown, stationary mirror brackets 44A through 44E are formed integral to the optical bench 34 for Mounting the stationary mirrors thereon. FIG. 27 is a top view of the light collecting mirror 33. The collector mirror 33 attaches to a collector bracket 35 by means of a pair of integrally-formed pivot arms 31 with distal hubs 29. The pivot arms 31 of collector mirror 33 snap fit into notches 30 formed in collector mirror bracket 35, and hubs 29 maintain the pivotal seating. With additional reference to FIG. 28, the beam directing surface 32 which is mounted to the collector mirror 33 must be aligned with the laser beam that is produced by the laser beam production module 39 during the manufacturing calibration process. Moreover, the collector mirror 33 must also be aligned for the efficient collection of returned light. The pivoting collector mirror 33 allows for easy and infinite adjustment of the collector mirror 33, and thus the beam directing surface 32, along the vertical direction during manufacturing. The snug fit between the bracket notches 30 and the pivot arms 31 of the mirror allows for an assembler to adjust the position of the mirror while preventing further unintentional movement of the mirror after the alignment is complete.

Pursuant to an alternate embodiment, the collector mirror 33 is mounted for dual-axis adjustment. This is accomplished by mounting the collector mirror 33 in a rectangular mirror frame (not shown) with pivot points at top and bottom. The collector mirror frame itself has additional pivot arms on the sides for fitting into the notches 30 of mirror bracket 35 (similar to the pivot arms shown integral to mirror 33 in FIG. 28). This combination of pivot points both at the top and bottom of the mirror and on the sides of the mirror frame provides for adjustment of the mirror in both a right-to-left direction as well as the up-and-down direction provided for in the scanner embodiment detailed above. In both cases, the pivoting collector mirror 33 can be adjusted and calibrated at the factory. If desired, the pivot points of the collector mirror 33 can be fixed by gluing after calibration.

Referring to FIGS. 11, 27 and 29, at the opposite end of the optical bench 34 the laser beam module support bench 41 is formed at a height above the mirror bracket array 44. This allows for mounting of the polygon 36 and rotating motor 37 below the laser beam production module 39. The laser beam production module 39 is mounted in the laser module mount bracket 28. The analog signal processing board 52 attaches to PC board bracket 54, above and behind the laser module mount bracket 28. The entire optical bench 34 may be implemented in the form of a single piece molded plastic unit, which holds some or all of the components that make up the omnidirectional laser scanning platform. Pursuant to one preferred embodiment of the invention, the collector mirror 33, beam directing surface 32, laser beam production module 39 and photodetector 51 are mounted above the polygon 36 and mirror array 38. However, it is within the scope of the invention to reverse the orientation of these components with respect to each other.

FIGS. 15–18 illustrate the manner in which an exemplary laser scanning platform according to the present invention may be mounted within housing 1007 of bar code scanner 1001 of FIG. 1. The functional and operational details of this scanning platform, as well as various hardware implementations, were discussed above in connection with FIGS. 10–12 for the scanner design of FIG. 5. Many of these details remain substantially unchanged when the scanning platform is mounted in housing 1007 of FIG. 1. Substantially identical components are used in the scanning platform that is mounted within the scanner of FIG. 1, except that these components are mounted to the interior of an enclosure having a cubic volume instead of a spherical volume.

Figure 15:
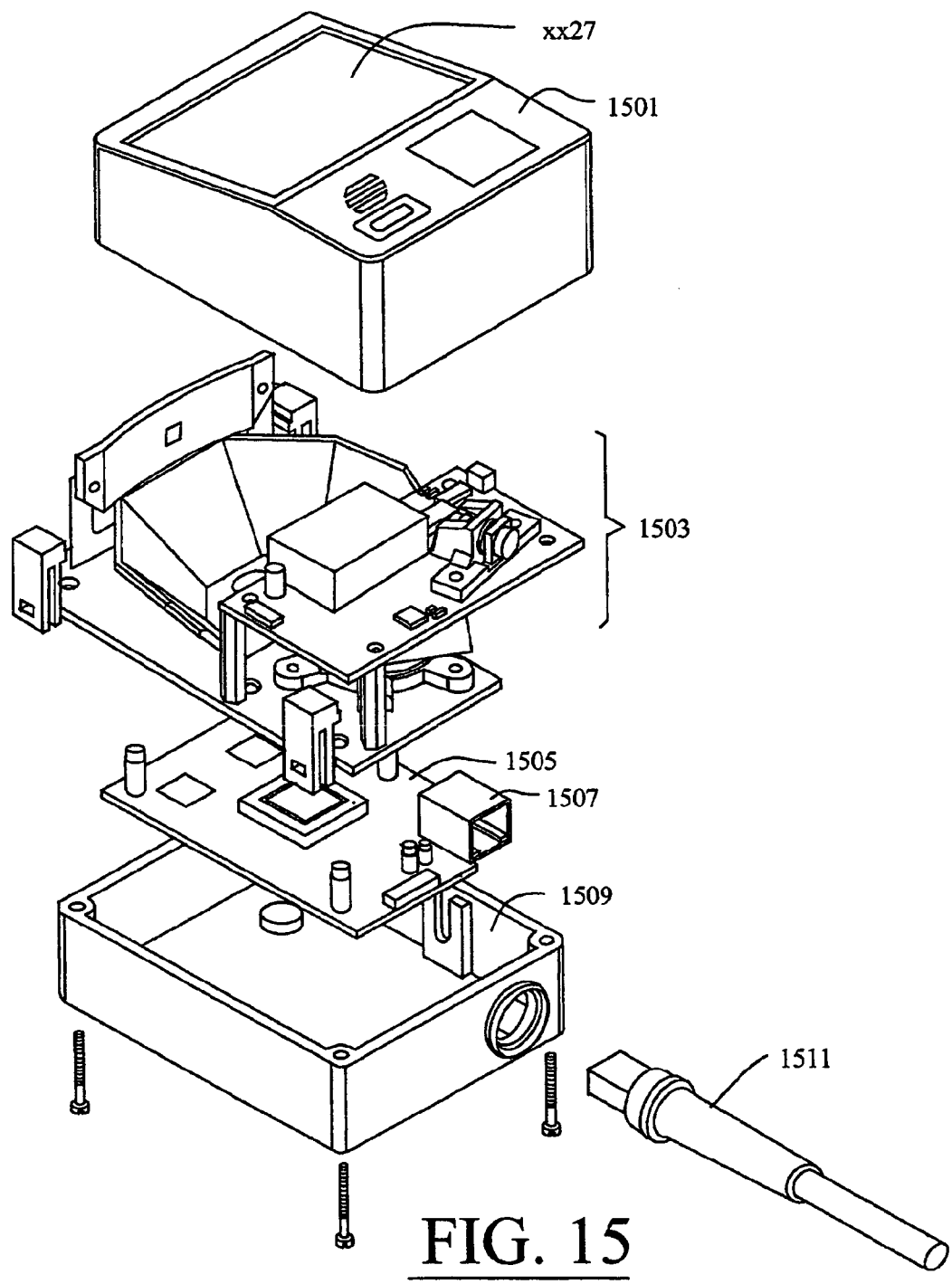
FIG. 15 is an exploded perspective view of the bar code scanner of FIG. 1.
Figure 16:
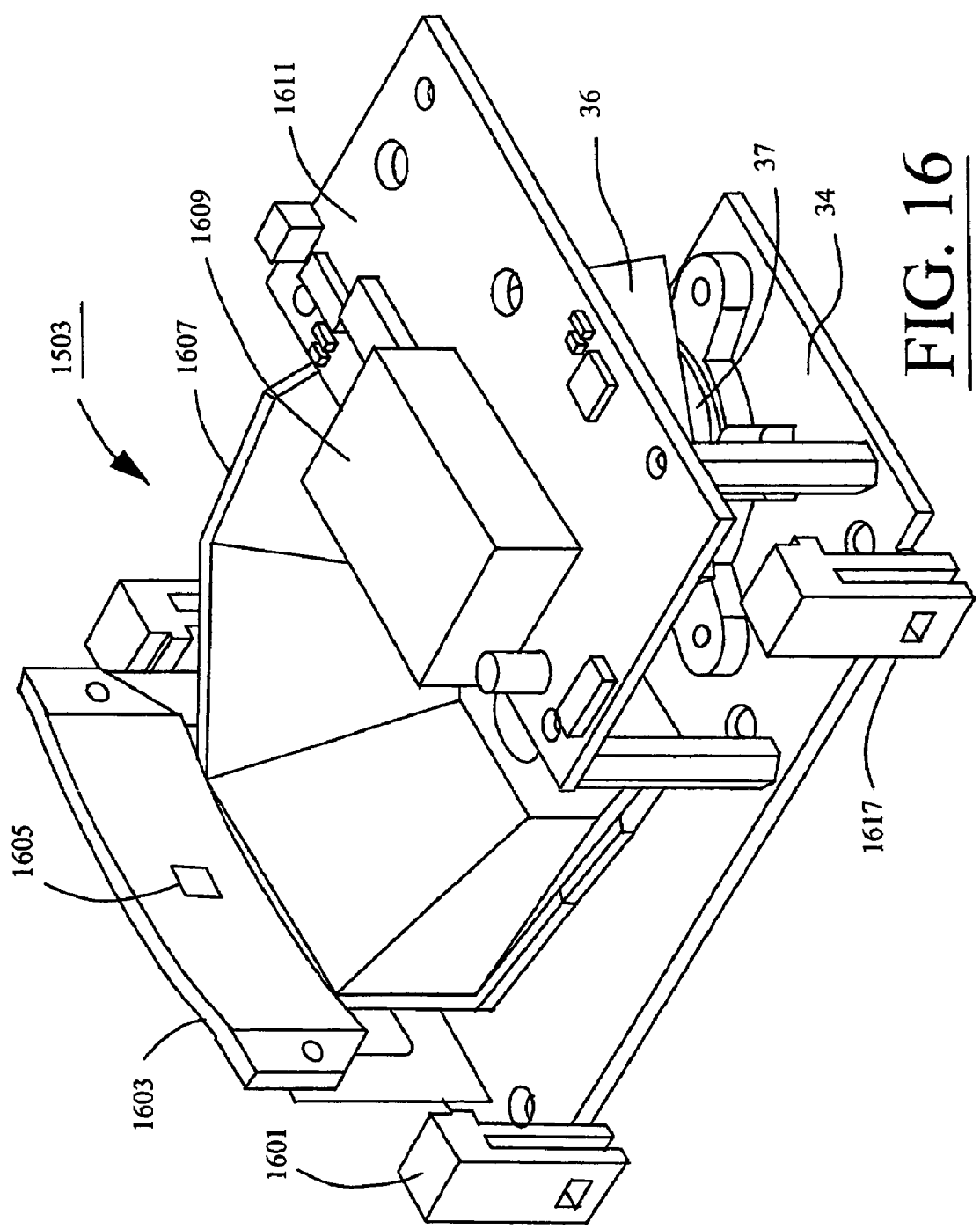
FIG. 16 is a perspective view of a substantially omnidirectional laser scanning platform which may be mounted within the housing of the bar code scanner of FIG. 1.

Refer to FIG. 15, which is an exploded perspective view of the bar code scanner of FIG. 1. Housing 1007 (FIG. 1) has been disassembled by separating housing front 1501, including window 1027, from housing bottom 1509. An optical subcomponents assembly 1503 is provided, similar to the assembly previously described in connection with FIG. 11. The optical components assembly, to be described more particularly hereinafter with reference to FIG. 16, is mounted to a printed circuit (PC) board 1505. PC board 1505 includes a cable port 1507 which provides a communications interface to a processing mechanism, personal computer, local-area network, data storage device, or the like. To this end, cable port 1507 is adapted to accept a communications cable 1511. However, cable port 1507 and communications cable 1511 are shown for illustrative purposes only, as any communications technique for transmitting information from one location to another could be employed, including wireless communication, wired communication, and various combinations thereof.

FIG. 16 is a perspective view of a substantially omnidirectional laser scanning platform which may be mounted within the housing of the bar code scanner of FIG. 1. More particularly, FIG. 16 provides a more detailed view of the optical subcomponents assembly 1503 described briefly in connection with FIG. 15. Optical subcomponents assembly 1503 includes a shock-absorption mechanism in the form of shock mounts 1601 and 1617. An optical bench 34 is provided, which was previously described in connection with FIGS. 10–12. A scanning polygon 36 is equipped with four light reflective surfaces. These surfaces are not shown in FIG. 16, but they are indicated as reference numerals 36A, 36B, 36C and 36D in FIGS. 10 and 11. Each of the four light reflective surfaces are disposed at a tilt angle with respect to the rotational axis of the polygon. An electrical motor 37 mounted on optical bench 34 has a rotatable shaft on which polygon 36 is mounted for rotational movement therewith. An array of stationary mirrors 1607 (five in the present example) are fixedly mounted with respect to optical bench 34; these mirrors correspond to reference numerals 38A, 38B, 38C, 38D and 38E of FIG. 12, but mirrors 38A and 38B have been cut away from the drawing of FIG. 16 for the purpose of clarity. A laser beam production module (shown in FIG. 17, reference numeral 1701) is fixedly mounted above the rotating polygon 36 for producing a laser beam having a circularized beam cross-section, and essentially free of astigmatism along its length of propagation.

A signal processing board 1611 is fixedly mounted over rotatable polygon 36. This signal processing board 1611 carries a photodetector 1609 for detecting reflected laser light and producing an analog signal, and signal processing control circuitry for performing various functions, including analog scan data signal processing. A light collecting mirror 1603, disposed above the array of stationary mirrors 1607, collects light rays reflected off the rotating polygon 36 and focuses these light rays onto photodetector 1609 on signal processing board 1611. A beam directing surface, realized as a flat folding mirror 1605 mounted on, formed in, and/or mounted proximate to, light collecting mirror 1603 for directing the laser beam from the laser beam production module to the rotating polygon 36 disposed therebeneath.

Figure 17:
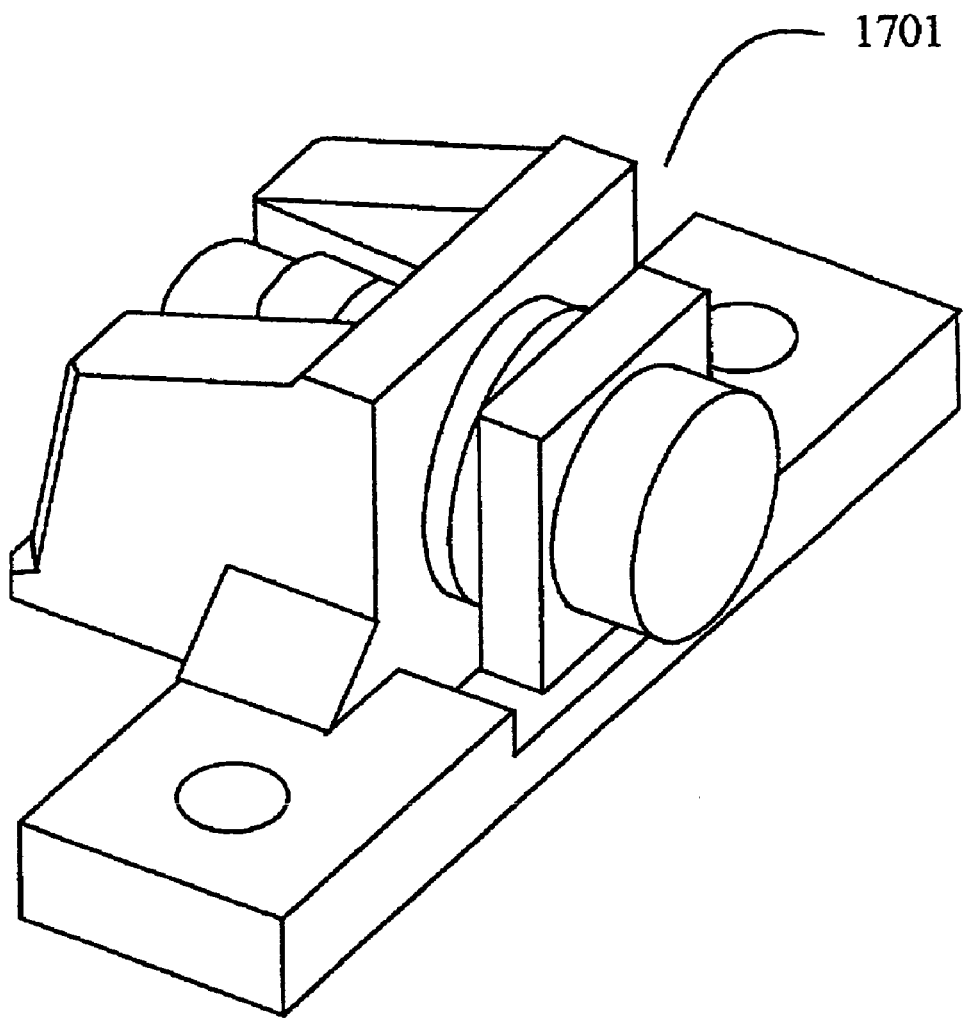
FIG. 17 is a detailed perspective view of the VLD block shown in FIG. 16.

FIG. 17 is a detailed perspective view of an illustrative laser beam production module for use with the hardware configuration of FIG. 16. In the example of FIG. 17, this laser beam production module is provided in the form of a VLD (visible laser diode) 1701. However, it is not required to use a wavelength in the visible range. It is alternatively possible to use an infrared beam production module and/or an ultraviolet beam production module. However, visible light permits a human operator to view the scanning pattern as it is projected outwardly from window 1027 (FIG. 1) under certain circumstances.

Having described the physical construction of the laser scanning platform of the present invention, it is appropriate at this juncture to describe the manner in which the laser scanning pattern is produced. A laser beam is produced from the laser beam production module (FIG. 12, 39; FIG. 17, 1701) and is directed towards the beam directing surface (FIG. 12, 32; FIG. 16, 1605) mounted on the light collector mirror (FIG. 12, 33; FIG. 16, 1603). The laser beam reflects from the beam directing surface 32, 1605 towards the mirrored facets on the rotating scanning polygon 36. As the polygon spins, the incident laser beam reflects off the rotating mirrors (36A through 36D of FIG. 11; 1607 of FIG. 16) and sweeps the laser beam about its rotational axis along a plurality of different paths which intersect the stationary array of mirrors 38A through 38E, 1607 on optical bench 34. During each revolution of the scanning polygon 36, the laser beam reflects off the rotating mirrors and is repeatedly swept across the array of stationary mirrors thereby producing first, second, third, fourth and fifth groups of plural scan lines, respectively. Each scan line in each group of scan lines is substantially parallel to each other scan line in that group of scan lines. The intersection of the groups of parallel scan lines produces a confined and/or collimated scanning pattern. The scan lines that make up this confined scanning pattern 13, as shown in FIGS. 30 and 31, are projected out through the light transmission window and intersect about a projection axis that extends outward from the light transmission window (FIG. 5, 14; FIG. 1, 1027) to produce a relatively confined scanning volume of substantially columnar, pyramidal, or frustral dimensions that may diverge slightly as distance to the scanning window increases. Within this collimated and/or confined scanning volume, a bar code symbol can be scanned omnidirectionally, while preventing unintentional scanning of code symbols on objects located outside of the scanning volume.

When a bar code symbol on an object is presented to the confined scanning pattern 13 projected through a confined scanning volume the bar code symbol is scanned independent of its orientation in the scanning volume. At least a portion of the laser light reflected from the scanned code symbol is directed through the light transmission window (FIG. 5, 14; FIG. 1, 1027) reflected off the stationary array of mirrors 38, reflected off the rotating polygon 36, focused by the light collection mirror 33 (FIG. 12), 1603 (FIG. 16) onto photodetector 51 (FIG. 12), 1609 (FIG. 16), whereupon an electrical signal is produced for use in decode signal processing.

The omnidirectional laser scanning platform of the present invention, as incorporated into any of the bar code scanners shown in FIGS. 1 and 5, can be automatically activated or can include manual activation means. Manual activation means can include a trigger or other switch located on the exterior of the scanner housing which when depressed activates the laser, the laser scanning mechanism, the photoreceiving circuitry and decoding circuitry. Laser bar code scanning systems employing manual activation means are well known in the art. Various embodiments of automatically-activated bar code symbol scanning systems are detailed in FIGS. 18, 19, 20 and 21. A number of the subsystems are common to all embodiments and are thus described in detail with respect to FIG. 18 only. However, the description of these subsystems applies similarly when they are included in other embodiments described herein.

Figure 18:
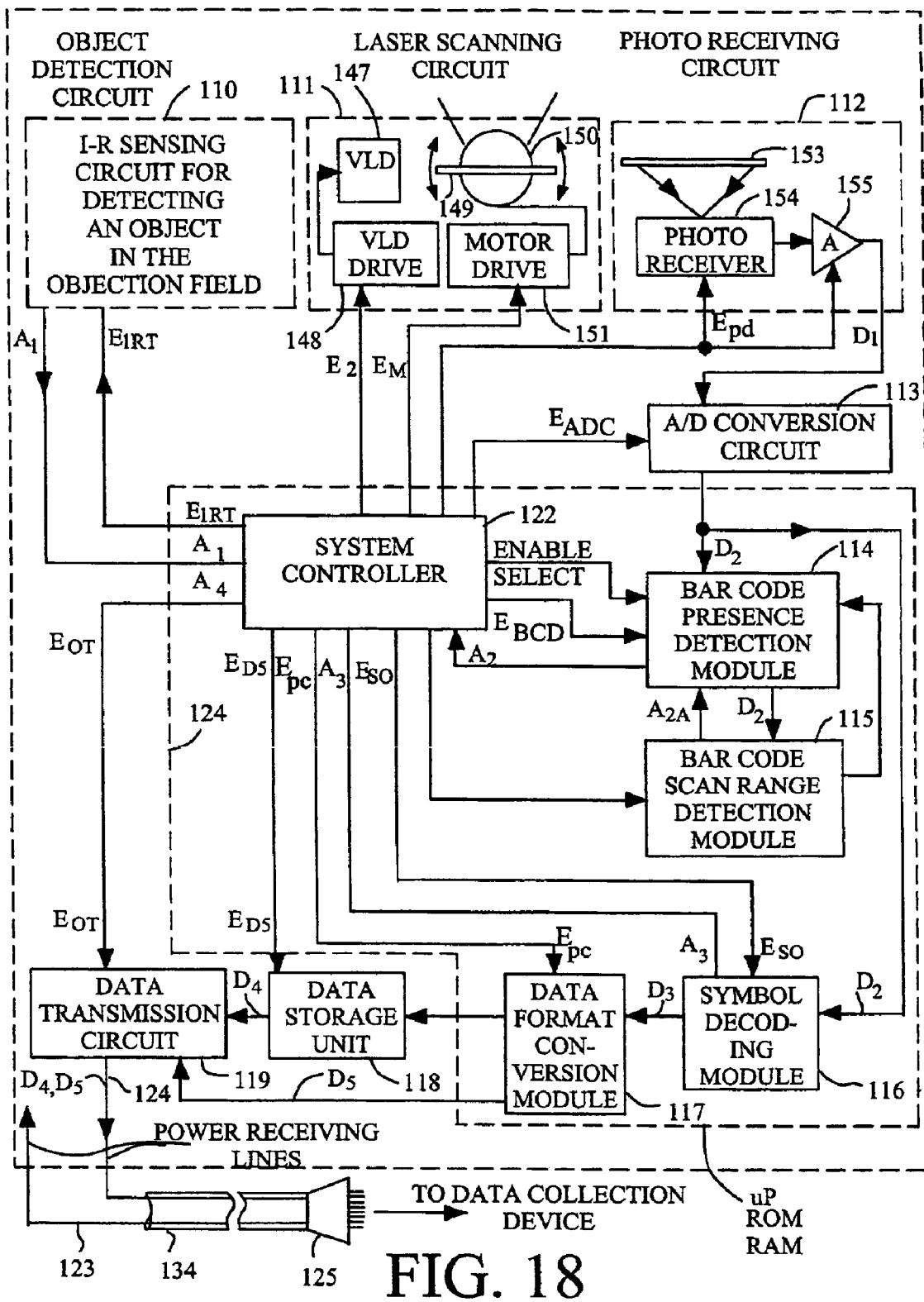
FIG. 18 is an electrical block diagram showing a first hardware embodiment for implementing an omnidirectional laser scanning platform mountable in the housing of the bar code scanners of FIG. 1 and/or FIG. 5.

FIG. 18 is an electrical block diagram showing a first hardware embodiment for implementing an omnidirectional laser scanning platform mountable in the housings of any of the bar code scanners of FIG. 1 and/or FIG. 5. The automatically activated bar code symbol scanning system of this first hardware embodiment is composed of a number of subsystems: an infrared (IR) based object detection subsystem 112, as disclosed in U.S. Pat. Nos. 5,260,553, 5,340,971 and 5,808,285, incorporated herein by reference; a scanning means 111; a photoreceiving circuit 112; an analog-to-digital conversion circuit 113; a bar code presence detection subsystem 114 as disclosed in prior U.S. Pat. Nos. 5,484,992 and 5,616,908 incorporated herein by reference; a bar code scan range detection module 115; a symbol decoding module 116; a data format conversion module 117; a symbol character data storage unit 118; and a data transmission circuit 119. As illustrated, these components are operably associated with a programmable system controller 122 which provides a degree of versatility in system control, capability and operation.

In accordance with the present invention, one purpose of the object detection subsystem is to perform the following primary functions during object detection: (i) automatically and synchronously transmitting and receiving pulse infrared (IR) signals within an IR-based object detection field; (ii) automatically detecting an object in at least a portion of the IR-based object field by analysis of the received IR pulse signals; and (iii) in response thereto, automatically generating a first control activation signal A1 indicative of such automatic detection of the object within the object detection field. As shown in FIG. 18, the first control activation signal A1 is provided to the system control subsystem 122 for detection, analysis and programmed response.

As illustrated in FIG. 18, the scanning circuit 111 includes, a light source 147 which is shown as a solid state visible laser diode (VLD), but can be any source of intense light suitably selected for maximizing the reflectivity from the object's surface bearing a bar code symbol, a scanning mechanism 150 such as a rotating polygon which is mounted on a rotating motor driven by motor drive 151. To selectively activate the laser light source 147 and scanning mechanism 150, upon receiving control activation signal A1, the system controller provides laser diode enable signal E.sub.L scanning mechanism enable signal E.sub.M as input to driver circuits 148 and 151 respectively. When signals E.sub.L and $E_M$ are at a logical high level the VLD is activated and the beam is scanned through the light transmission aperture and across the scan field.

When an object, such as a product bearing a bar code symbol, is presented within the scan field at the time of scanning, the laser beam incident thereon will be reflected. This will produce a laser light return signal of variable intensity which represents a spatial variation of light reflectivity characteristic of the spaced apart pattern of bars comprising the bar code symbol. Photoreceiving circuit 112 detects at least a portion of laser light of variable intensity, which is reflected off the object and bar code symbol within the scan field. Upon detection of this scan data signal, photoreceiving circuit 112 produces an analog scan data signal $D_1$ indicative of the detected light intensity. Analog scan data signal $D_1$ is provided as input to A/D conversion circuit 113. As is well known in the art, A/D conversion circuit 113 processes analog scan data signal $D_1$ to provide a digital scan data signal $D_2$ which resembles, in form, a pulse width modulated signal, where logical "1" signal levels represent spaces of the scanned bar code symbol and logical "0" signal levels represent bars of the scanned bar code symbol. A/D conversion circuit 113 can be realized by any conventional A/D chip. Digitized scan data signal $D_2$ is provided as input to bar code presence detection module 114 and symbol decoding module 116.

The bar code presence detection module performs the following functions during bar code symbol detection: (i) automatically generating an omnidirectional visible laser scanning pattern within the bar code symbol detection field defined relative to the scanner housing, to enable scanning of a bar code symbol on the detected object; (ii) automatically processing scan data collected from the bar code symbol detection field and detecting the presence of the bar code symbol thereon; and (iii) automatically generating a control activation signal A2=1 indicative thereof in response to the automatic detection of the bar code symbol. As shown in FIG. 18, the second control activation signal A2 is provided to the system controller 122 for detection, analysis and programmed response.

The bar code presence detection module is to determine whether a bar code is present or absent from the scan field over a time interval specified by the system controller, by detecting a bar code symbol "envelop" from digital scan data signal $D_2$ by analyzing the digital count and sign data in the signal. When a bar code symbol "envelop" is detected in the scan field, and the bar code presence detection module provides signal A2 to the system controller 122 which then causes the system to undergo a transition for the bar code presence detection state to the bar code reading state.

Within the context of the system design shown in FIG. 18, the bar code symbol decoding module 116 performs the following functions during the bar code symbol reading state: (i) automatically generating an omnidirectional visible laser scanning pattern within the scan field, to enable scanning of the detected bar code symbol therein; (ii) automatically decode-processing scan data collected from the scan field so as to detect the bar code symbol on the detected object; 30 (iii) automatically generating a third control activation signal A3=1 indicative of a successful decoding operation, and producing decoded symbol character data representative of the detected and read bar code symbol. As shown in FIG. 18, the third control activation signal A3 is provided to the system controller 122 for detection, analysis and programmed response.

Upon receiving control activation signal A3, the system controller 122 generates and provides enable signals $E_{FC}$, $E_{DS}$, and $E_{DT}$ to the data format conversion module 117, data storage unit 118, and data transmission circuit 119, respectively at particular stages of its control program. Symbol decoding module 116 provides decoded symbol character data D3 to data format module 117 to convert data D3 into two differently formatted types of symbol character data, namely D4 and D5. Format-converted symbol character data D4 is of the "packed data" format, particularly adapted for efficient storage in the data storage unit 118. Format-converted symbol character data D5 is particularly adapted for data transmission to data collection and storage device, or a host device such as a computer or electronic cash register. When format converted data D5 is to be transmitted to a host device, the system controller 122 will generate and provide enable signal $E_{DT}$ to data transmission circuit 119. Thereupon, data transmission circuit 119 transmits format-converted data D5 to the data collection or host device via the data transmission lines of flexible connector cable 125.

Figure 19:
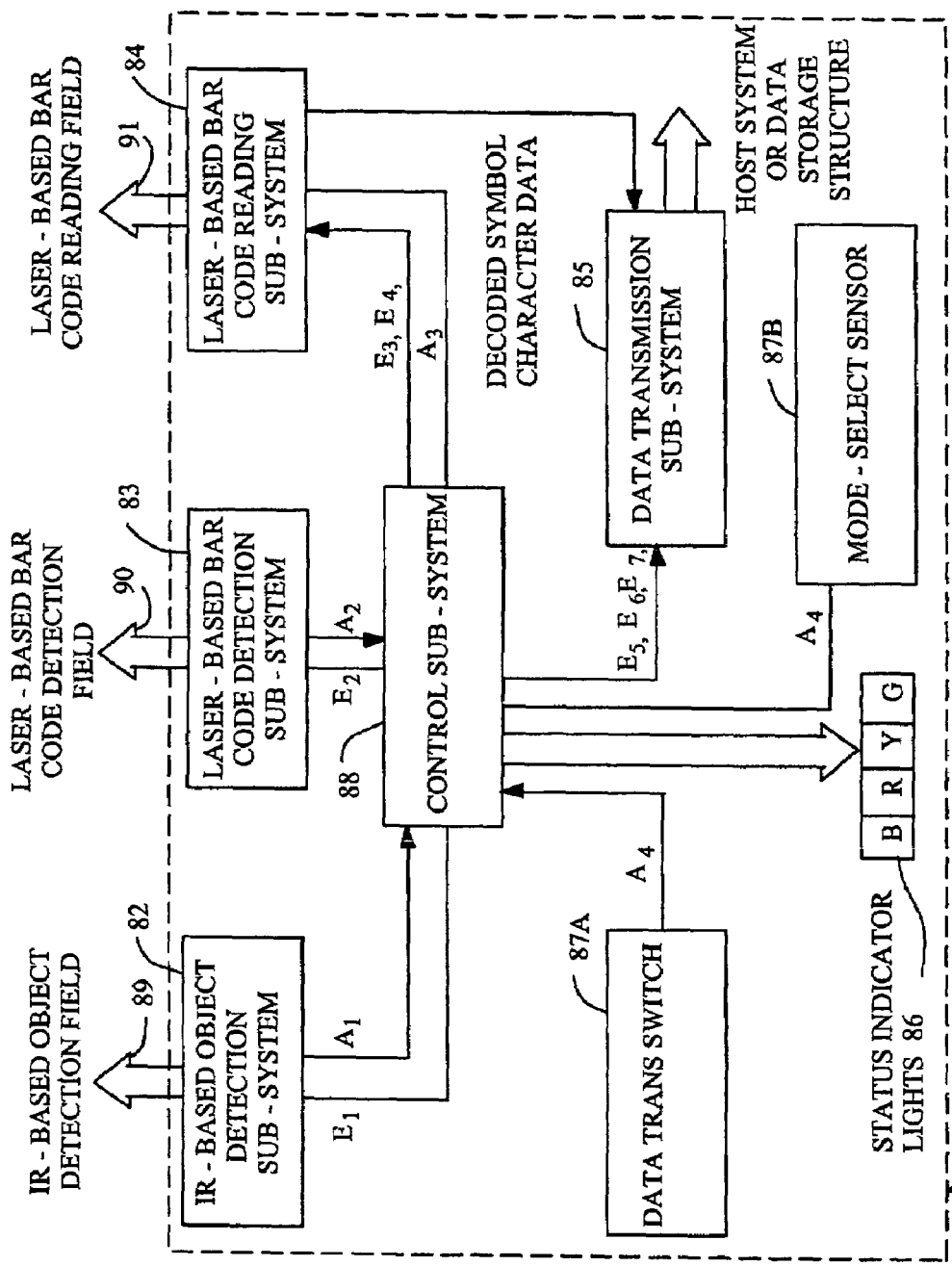
FIG. 19 is an electrical block diagram showing a second hardware embodiment for implementing an omnidirectional laser scanning platform mountable in the housing of the bar code scanners of FIG. 1 and/or FIG. 5.

FIG. 19 is an electrical block diagram showing a second hardware embodiment for implementing an omnidirectional laser scanning platform mountable in the housing of the bar code scanners of FIG. 1 and/or FIG. 5. As shown in FIG. 19, an automatically activated bar code symbol scanning system constructed in accordance with this second embodiment is composed of a number of subsystems as well, namely an IR-based object detection subsystem 82; a laser-based bar code symbol detection subsystem 83; a laser-based bar code symbol reading subsystem 84; a data transmission subsystem 85; a state indication subsystem 86; a data transmission activation switch or control device 87A integrated with the scanner housing in part or whole; a mode-selection sensor 87B integrated with the scanner housing in part or whole; and a system control subsystem 88 operably connected to the other subsystems described above. In general, system 79 has a number of preprogrammed operational states, namely: an object detection state; a bar code symbol detection state; a bar code symbol reading state; and a data transmission state.

Within the context of the hardware design shown in FIG. 19, the IR-based object detection subsystem 82 performs the following functions during the object detection state: (i) automatically and synchronously transmitting and receiving pulse infrared (IR) signals within an IR-based object detection field 89 defined relative to the scanner housing 10; (ii) automatically detecting an object in a least a portion of the IR-based object detection field 89 by analysis of the received IR pulse signals; and (iii) in response thereto, automatically generating a first control activation signal A1 indicative of such automatic detection of the object within the object detection field. As shown in FIG. 19, the first control activation signal A1=1 is provided to the system control subsystem 88 for detection, analysis and programmed response. When control activation signal A1=1 is received by the system controller the bar code symbol reading device is caused to undergo a state transition from bar code symbol detection state to bar code symbol detection state. This transition has been described in detail in connection with the embodiment shown in FIG. 18. As shown in the figures hereof; object detection, bar code detection and bar code reading fields 89, 90 and 91, respectively, have been schematically represented only general terms. For purposes of clarity, the specific characteristics of these fields have not been shown. Notably, however, such characteristics can be ascertained from the various references relating thereto which are identified and incorporated herein by reference.

Within the context of the hardware design shown in FIG. 19, the laser-based bar code symbol detection subsystem 83 performs the following primary functions during the bar code symbol detection state: (i) automatically generating a visible laser scanning pattern of predetermined characteristics within the laser-based bar code (symbol) detection field 90, defined relative to the scanner housing (not shown), to enable scanning of a bar code symbol on the detected object; (ii) automatically processing scan data collected from the bar code symbol detection field 89 and detecting the presence of the bar code symbol thereon; and (iii) automatically generating a control activation signal A2=1 indicative thereof in response to the automatic detection of the bar code symbol. As shown in FIG. 19, the second control activation signal A2 is provided to the system control subsystem 88 for detection, analysis and programmed response. When second control activation signal A2 is provided to the system control subsystem 88, this causes the bar code symbol reading device to undergo a state transition from bar code symbol detection state to bar code symbol reading state. This transition has also been described in detail in connection with FIG. 18 above.

Within the context of the hardware design shown in FIG. 19, the laser-based bar code symbol reading subsystem 84 performs the following functions during the bar code symbol reading state: (i) automatically generating an omnidirectional visible laser scanning pattern within the laser-based bar code symbol reading field 91 defined relative to the scanner housing, to enable scanning of the detected bar code symbol therein; (ii) automatically decode-processing scan data collected from the bar code symbol reading field 91 so as to detect the bar code symbol on the detected object, (iii) automatically generating a third control activation signal A3=1 indicative of a successful decoding operation, and producing decoded symbol character data representative of the detected and read bar code symbol. As shown in FIG. 19, the third control activation signal A3 is provided to the system control subsystem 88 for detection, analysis and programmed response. The system control subsystem 88 responds as described above in relation to FIG. 18, whereby the data is decoded and formatted and sent to the data transmission subsystem 85.

Within the context of the hardware design shown in FIG. 19, the data transmission subsystem 85 during the data transmission state automatically transmits produced symbol character data to the host system (to which the bar code reading device is connected) or to some other data storage and/or processing device, only when the system control subsystem 88 detects the following conditions: (1) generation of third control activation signal A3=1 within a predetermined time period, indicative that the bar code symbol has been read; and (ii) generation of data transmission control activation control signal A4=1 (e.g. produced from manually-actuatable switch 87A) within a predetermined time frame, indicative that the user desires the produced bar code symbol character data to be transmitted to the host system or intended device.

Within the context of the hardware design shown in FIG. 19, the state-selection sensor 87B has two functions: (i) to automatically generate the fourth control activation signal A4=1 whenever the scanner housing has been placed on a countertop or like surface, so that the system is automatically induced into its automatic hands-free mode of operation; and (ii) to automatically generate the fourth control activation signal A4=0 whenever the scanner housing has been lifted off of a countertop or like surface, so that the system is automatically induced into its automatic hands-on mode of operation. In the automatic hands-free mode of operation, the state-selection sensor 87B effectively overrides the data transmission switch 87A. In the automatic hands-on mode of operation, the data transmission switch 87A effectively overrides the state-selection sensor 87B.

Within the context of the hardware design shown in FIG. 19, the system control subsystem 88 performs the following primary functions: (i) automatically receiving control activation signals A1, A2, A3 and A4; (ii) automatically generating enable signals E1, E2, E3, and E4; and (iii) automatically controlling the operation of the other subsystems in accordance with a system control program carried out by the system control subsystem 88 during the various modes of system operation.

Figure 20:
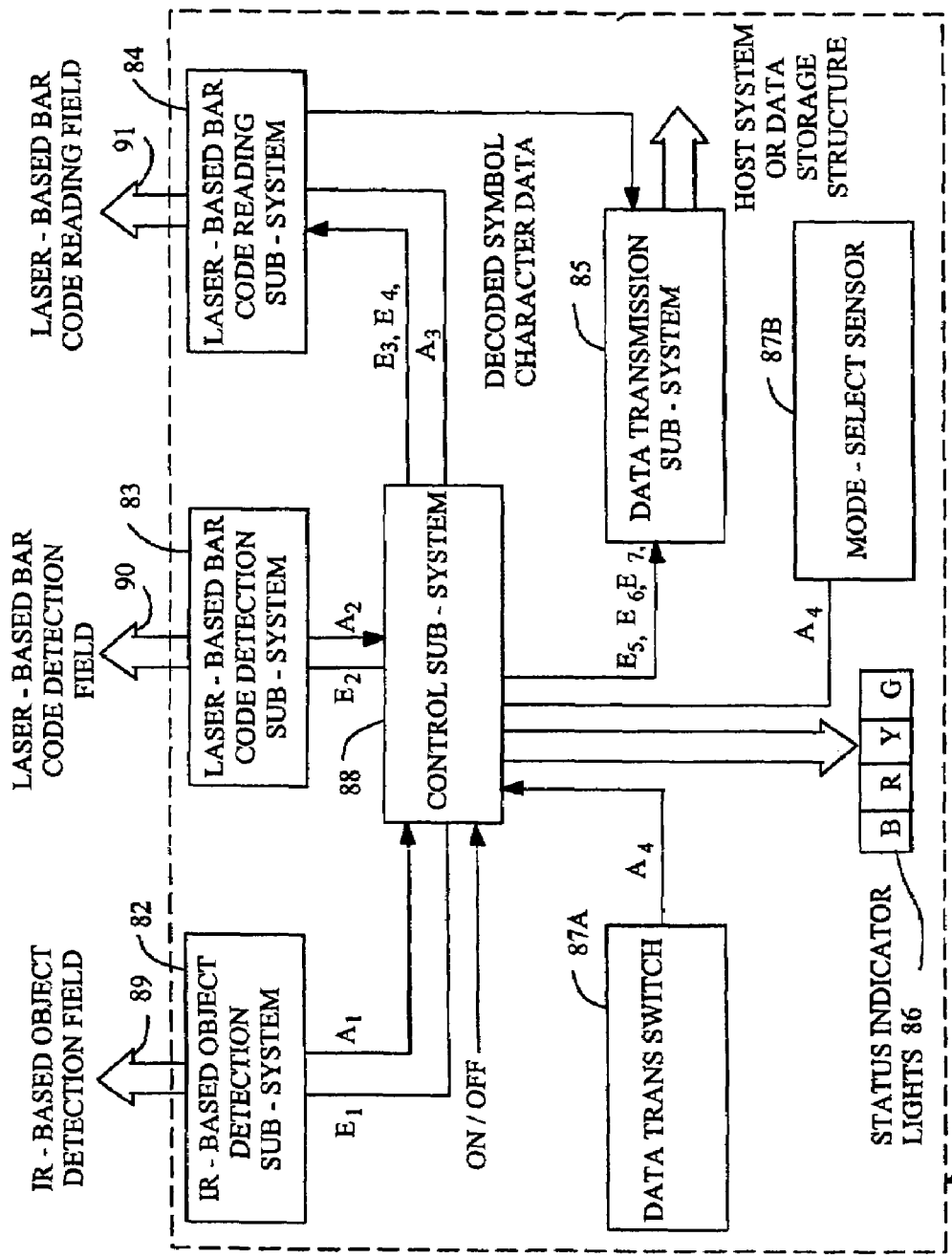
FIG. 20 is an electrical block diagram showing a third hardware embodiment for implementing an omnidirectional laser scanning platform mountable in the housing of the bar code scanners of FIG. 1 and/or FIG. 5.
Figure 21:
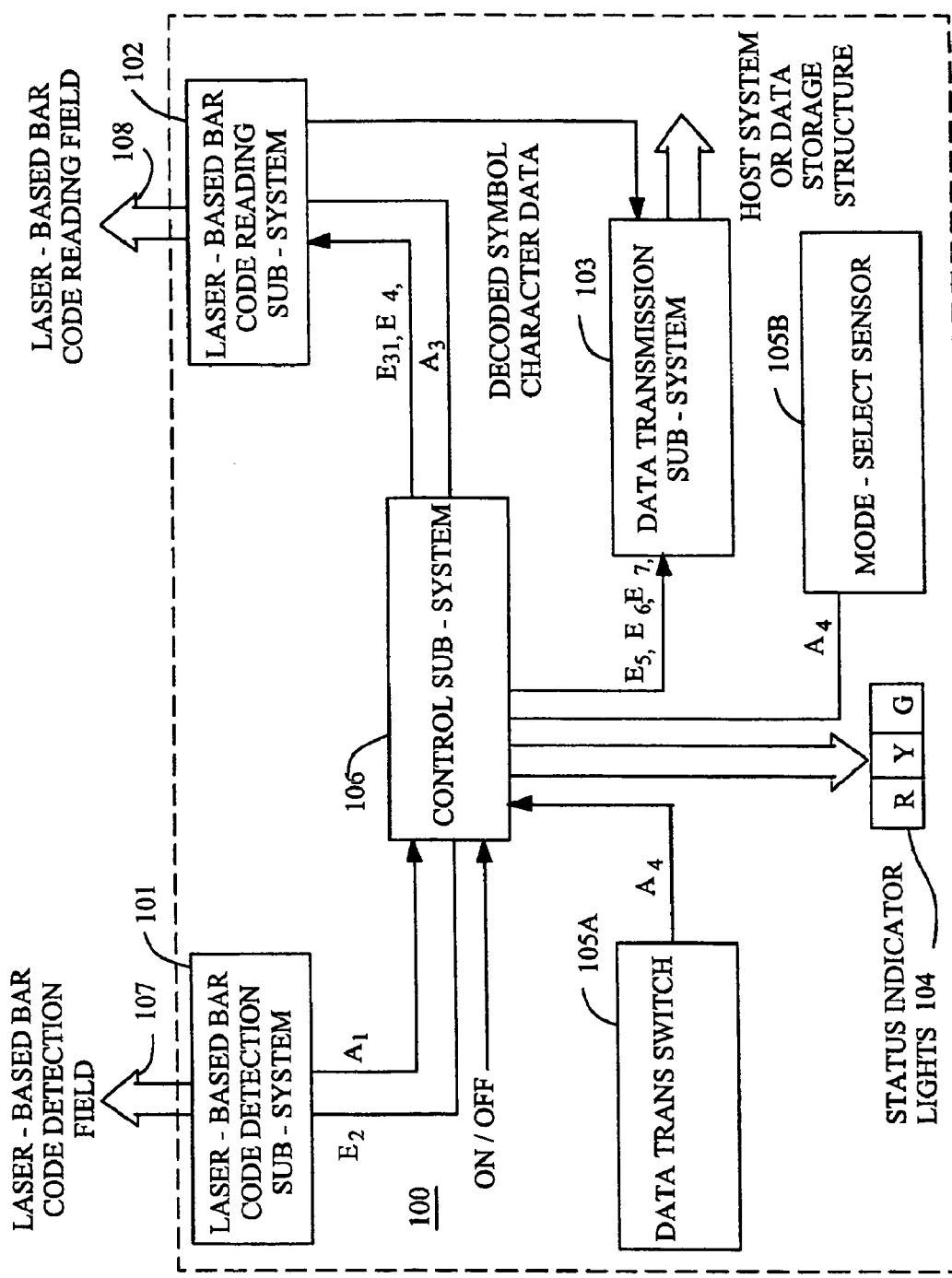
FIG. 21 is an electrical block diagram showing a fourth hardware embodiment for implementing an omnidirectional laser scanning platform mountable in the housing of the bar code scanners of FIG. 1 and/or FIG. 5.

FIGS. 20 and 21 illustrate an automatically-activated laser bar code scanning system which does not provide an object detection subsystem. This bar code scanning system is activated from the bar code presence detection state. The automatically-activated laser bar code scanning system concept is shown in related patent application Ser. No. 09/204,176 (the '176 application being commonly owned by Metrologic Instruments, Inc. and incorporated herein by reference).

FIG. 20, shows a third hardware embodiment for implementing an omnidirectional laser scanning platform mountable in the housing of the bar code scanners of FIG. 1 and/or FIG. 5. An automatically-activated bar code symbol scanning platform 100 pursuant to this third embodiment comprises a number of subsystems, namely: a laser-based bar code symbol detection subsystem 101; a laser-based bar code symbol reading subsystem 102; a data transmission subsystem 103; a state indication subsystem 104; a data transmission activation switch or control device 105A integrated with the scanner housing (not shown) in part or whole; a mode-selection sensor 105B integrated with the scanner housing in part or whole; and a system control subsystem 106 operably connected to the other subsystems described above. In general, the system 100 has a number of preprogrammed states of operation, namely: an object detection state; a bar code symbol detection state; a bar code symbol reading state; and a data transmission state.

Within the context of the system design shown in FIG. 20, the laser-based bar code symbol detection subsystem 101 performs the following primary functions during the bar code symbol detection state: (i) automatically generates a pulsed visible laser scanning pattern of predetermined characteristics within a laser-based bar code symbol detection field 107, defined relative to the scanner housing, to enable the detection of a bar code symbol on an object located in the field 107; (ii) automatically processes scan data collected from the bar code symbol detection field 107 and detects the presence of the bar code symbol thereon; and (iii) automatically generates a control activation signal A2=1 indicative thereof in response to the automatic detection of the bar code symbol. As shown in FIG. 20, the second control activation signal A2 is provided to the system control subsystem 106 for detection, analysis and programmed response. When second control activation signal A2 is provided to the system control subsystem 88, this causes the bar code symbol reading device to undergo a state transition from bar code symbol detection state to bar code symbol reading state. This transition has been previously described in detail in connection with FIG. 18 above.

Within the context of the system design shown in FIG. 20, the laser-based bar code symbol reading subsystem 102 performs the following functions during the bar code symbol reading state: (i) automatically generates a visible laser scanning pattern of predetermined characteristics within a laser-based bar code (symbol) reading field 108 defined relative to the scanner housing, to enable scanning of the detected bar code symbol therein; (ii) automatically decode-processes scan data collected from the bar code symbol reading field 108 so as to detect the bar code symbol on the detected object; (iii) automatically generates a third control activation signal A3=1 indicative of a successful decoding operation, and produces decoded symbol character data representative of the detected and read bar code symbol. As shown in FIG. 20, the third control activation signal A3 is provided to the system control subsystem 106 for detection, analysis and programmed response. The system control subsystem 106 responds as described above in relation to FIG. 18, whereby the data is decoded and formatted and sent to the data transmission subsystem 103.

Within the context of the system design shown in FIG. 20, the data transmission subsystem 103 during the Data Transmission State automatically transmits produced symbol character data to the host system (to which the bar code reading device is connected) or to some other data storage and/or processing device, only when the system control subsystem 106 detects the following conditions: (1) generation of third control activation signal A3=1 within a predetermined time period, indicative that the bar code symbol has been read; and (ii) generation of data transmission control activation signal A4=1 (e.g. produced from manually-actuatable switch 105A) within a predetermined time frame, indicative that user desires the produced bar code symbol character data to be transmitted to the host system or intended device.

Within the context of the system design shown in FIG. 20, the state-selection sensor 105B has two primary functions: (i) to automatically generate the fourth control activation signal A4=1 whenever the scanner housing has been placed on a countertop or like surface so that the system is automatically induced into an automatic hands-free mode of operation; and (ii) to automatically generate the fourth control activation signal A4=0 whenever the scanner housing has been lifted off of a countertop or like surface so that the system is automatically induced into an automatic hands-on mode of operation. In the automatic hands-free mode of operation, the mode-select sensor 105B effectively overrides the data transmission switch 105A. In the automatic hands-on mode of operation, the data transmission switch 105A effectively overrides the mode-select sensor 105B.

Within the context of the system design shown in FIG. 20, the system control subsystem 106 performs the following primary functions: (i) automatically receiving control activation signals A2, A3 and A4; (ii) automatically generating enable signals E2, E3, and E4; and (iii) automatically controlling the operation of the other subsystems in accordance with a system control program carried out by the system control subsystem 106 during the various modes of system operation.

FIG. 21 is an electrical block diagram showing a fourth hardware embodiment for implementing an omnidirectional laser scanning platform mountable in the housing of the bar code scanners of FIG. 1 and/or FIG. 5. This fourth embodiment includes a number of subsystems, namely: a laser-based bar code symbol detection subsystem 131; a laser-based bar code symbol reading subsystem 132; a data transmission subsystem 133; a state indication subsystem 134; and a system control subsystem 136 operably connected to the other subsystems described above. In general, the system 130 has a number of preprogrammed states of operation, namely: a bar code symbol detection state; a bar code symbol reading state; and a data transmission state.

Within the context of the system design shown in FIG. 21, the laser-based bar code symbol detection subsystem 131 performs the following primary functions during the bar code symbol detection state: (i) automatically generates a pulsed visible laser scanning pattern of predetermined characteristics within a laser-based bar code symbol detection field 137, defined relative to the scanner housing, to enable the detection of a bar code symbol on an object located in the field 137; (ii) automatically processes scan data collected from the bar code symbol detection field 137 and detects the presence of the bar code symbol thereon; and (iii) automatically generates a control activation signal A2=1 indicative thereof in response to the automatic detection of the bar code symbol. As shown in FIG. 21, the second control activation signal A2 is provided to the system control subsystem 136 for detection, analysis and programmed response. When second control activation signal A2 is provided to the system control subsystem 136, this causes the bar code symbol reading device to undergo a state transition from bar code symbol detection state to bar code symbol reading state. This transition has been described in detail in connection with FIG. 18 above.

Within the context of the system design shown in FIG. 21, the laser-based bar code symbol reading subsystem 132 performs the following functions during the bar code symbol reading state: (i) automatically generates a visible laser scanning pattern of predetermined characteristics within a laser-based bar code (symbol) reading field 138 defined relative to the scanner housing, to enable scanning of the detected bar code symbol therein; (ii) automatically decode-processes scan data collected from the bar code symbol reading field 138 so as to detect the bar code symbol on the detected object; (iii) automatically generates a third control activation signal A3=1 indicative of a successful decoding operation, and produces decoded symbol character data representative of the detected and read bar code symbol. As shown in FIG. 21, the third control activation signal A3 is provided to the system control subsystem 136 for detection, analysis and programmed response. The system control subsystem 136 responds as described above in relation to FIG. 18, whereby the data is decoded and formatted and sent to the data transmission subsystem 133.

Within the context of the system design shown in FIG. 21, the data transmission subsystem 133 during the data transmission state automatically transmits produced symbol character data to the host system (to which the bar code reading device is connected) or to some other data storage and/or processing device, only when the system control subsystem 136 detects the generation of third control activation signal A3=1 within a predetermined time period, indicative that the bar code symbol has been read.

Within the context of the system design shown in FIG. 21, the system control subsystem 136 performs the following primary functions: (i) automatically receiving control activation signals A2, A3 and A4; (ii) automatically generating enable signals E2, E3, and E4; and (iii) automatically controlling the operation of the other subsystems in accordance with a system control program carried out by the system control subsystem 106 during the various modes of system operation.

Having set forth various preferred embodiments and certain modifications to the concepts underlying the present invention, various other embodiments as well as certain variations and modifications of the embodiments herein shown and described will obviously occur to those skilled in the art upon becoming familiar with the underlying concepts. It is to be understood, therefore, that the invention may be practiced otherwise than as specifically set forth in the appended claims. While the particular illustrative embodiments shown and described above will be useful in many applications in code symbol reading, further modifications to the present invention herein disclosed will occur to persons with ordinary skill in the art. All such modifications are deemed to be within the scope and spirit of the present invention defined by the appended Claims to Invention.

What is claimed is:

1. A bar code scanner, comprising:
    a housing including: (i) a substantially omnidirectional laser scanning platform mounted therein, and (ii) a window for admitting laser energy into the housing and for allowing laser energy to pass out of the housing;
    a protective sheath encasing the housing that functions as a shock-absorbing mechanism to protect against damage if the bar code scanner is dropper or subjected to mechanical shock; and
    a movable bracket adjustably mounted to the housing such that, if the movable bracket is mounted to a fixed surface, the movable bracket remains fixed, but permits adjustment of housing to any of a plurality of positions relative to the fixed surface.

2. The bar code scanner of claim 1 wherein the protective sheath is fabricated of at least one of rubber and flexible plastic.

3. The bar code scanner of claim 2 wherein the protective sheath is fabricated so as to permit removal of the sheath from the housing.

4. The bar code scanner of claim 3 wherein the protective sheath includes one or more projections and mating notches, each notch mating with a corresponding projection, so as to facilitate quick and easy removal and installation of the protective sheath on the housing.

5. The bar code scanner of claim 3 wherein the protective sheath is removable from, and reinstallable on, the housing, without the use of any projections or notches, by a mechanical flexure of the protective sheath.

6. The bar code scanner of claim 2 wherein the protective sheath is a substantially permanent part of the housing.

7. The bar code scanner of claim 2 wherein the housing defines an approximate cubic volume having an upper surface with four upper corners and a lower surface with four lower corners.

8. The bar code scanner of claim 7 wherein the protective sheath protects the four upper corners and four lower corners of the bar code scanner.

9. The bar code scanner of claim 2 wherein the housing is provided with at least one of an LED power indicator and an LED "good bar code read" indicator.

10. The bar code scanner of claim 2 wherein the housing is molded of hard plastic.

11. The bar code scanner of claim 10 wherein the housing is formed in two half-sections with tongue-and-groove edges to provide an interlocking fit.

12. The bar code scanner of claim 2 wherein the window is generally square or rectangular in configuration and mounted in an aperture of the housing.

13. The bar code scanner of claim 12 wherein the window is held by, one or more grooves or projections formed in the housing.

14. The bar code scanner of claim 13 wherein the window is fabricated of a square or rectangular section of transparent acrylic plastic with optical filtering properties.

15. The bar code scanner of claim 1 wherein the protective sheath includes an opening such that, when the protective sheath is installed on the housing, the opening substantially coincides with the window.

16. The bar code scanner of claim 1 wherein the movable bracket includes a position adjustment mechanism providing position adjustment of the housing relative to the bracket about a rotational axis a–a'.

17. The bar code scanner of claim 16 wherein the position adjustment mechanism is provided in the form of an annular flange having an inner diameter and an outer diameter.

18. The bar code scanner of claim 17 wherein, along an interior (inner) surface of the annular flange proximate to the housing, between the inner and outer diameters, are provided one or more projections, notches, ridges, grooves, nubs, fingers, detents, or bosses that engage one or more corresponding mating structures on the housing.

19. The bar code scanner of claim 18 wherein the one or more projections, notches, ridges, grooves, nubs, fingers, detents, or bosses are provided in the form of a plurality of rounded teeth that engage one or more corresponding rounded grooves of the housing.

20. The bar code scanner of claim 16 wherein the movable bracket includes two or more mounting holes for mounting to a surface such as a countertop or point of sale terminal.

21. The bar code scanner of claim 1 wherein the protective sheath is provided in the form of a removable and reinstallable encasement fabricated of a rubberized shock-absorbing material.

22. The bar code scanner of claim 1 adapted to perform scanning operations from a hand-held position, a free-standing position, and a fix-mounted position; wherein the hand-held and free-standing positions are achieved by permitting the removable bracket to rest upon a surface but wherein the bracket is not attached to the surface; and wherein the fix-mounted position is achieved by mounting the bracket to the surface.

23. The bar code scanner of claim 22, wherein the housing and the scanning platform provide a substantially omnidirectional scan from a free-standing fixed position atop a counter or while handheld by a user.

24. The bar code scanner of claim 1 adapted to perform scanning operations from a handheld position, a free-standing position, and a fix-mounted position; wherein the removable bracket is attached to the surface and at least one of the hand-held position and the free-standing position is achieved by removing the housing from the removable bracket.

25. The bar code scanner of claim 24, wherein the housing and the scanning platform provide a substantially omnidirectional scan from a free-standing position fixed atop a counter or while handheld by a user.

26. The bar code scanner of claim 1 wherein the scanning platform includes an object detection circuit for detecting and determining the presence of an object within an operative scanning range.

27. The bar code scanner of claim 1 wherein the removable bracket has a flat bottom configured for placement directly on a counter-top surface.

28. The bar code scanner of claim 1 wherein the housing has a substantially flat bottom configured for placement directly on a counter-top surface.

29. The bar code scanner of claim 1 wherein the movable bracket is detachable from the housing.

30. A bar code scanner comprising:

a scanner housing having an approximately cubical volume and comprising a light transmission aperture;

an adjustable mounting bracket removably attached to the scanner housing;

a protective sheath encasing the housing that functions as a shock-absorbing mechanism to protect against damage if the bar code scanner is dropped or subjected to mechanical shock;

an omnidirectional laser scanning engine mounted within the housing and including:

(i) a laser beam producing mechanism for producing a laser beam, (ii) a laser beam sweeping mechanism having at least first, second and third light reflective surfaces each being disposed at a different acute angle with respect to a rotational axis of the laser beam sweeping mechanism for sequentially sweeping the laser beam about the rotational axis along a plurality of different paths, (iii) a stationary array of at least first second, third and fourth light reflective surfaces;

(iv) a laser light collection subsystem, including a light collection element for collecting return laser light, the light collection subsystem further including a light receiving mechanism for detecting the collected return laser light and producing an electrical signal indicative of the detected laser light, (v) a signal processing mechanism for processing the electrical signal and producing scan data representative of a scanned code symbol, and (vi) a control mechanism for controlling the operation of the omnidirectional laser scanning engine.

31. The bar code scanner of claim 30, wherein a beam directing element is mounted to the light collection element for folding the laser beam in the housing.

32. The bar code scanner of claim 30 further comprising: an object detection mechanism mounted in the housing for detecting an object located in an object detection field defined external to the housing and for generating a first activation signal for transmission to the control mechanism, whereby the laser beam producing mechanism, the laser beam sweeping mechanism, the light receiving mechanism and the signal processing mechanism are automatically activated upon the detection of the object.

33. A laser scanner comprising:

a hand-supportable housing having a light transmission window through which laser light can exit the hand-supportable housing, travel towards an object bearing a code symbol and reflect therefrom, and at least a portion of the reflected laser light travel back through the light transmission window and enter the hand-supportable housing; wherein the hand-supportable housing having a longitudinal extent which extends along a central reference axis;

a movable bracket adjustably mounted to the housing such that, if the movable bracket is mounted to a fixed surface, the movable bracket remains fixed, but permits adjustment of housing to of a plurality of positions relative to the fixed surface;

a protective sheath encasing the housing that functions as a shock-absorbing mechanism to protect against damage if the bar code scanner is dropped or subjected to mechanical shock; and a laser beam producing mechanism disposed within the hand-supportable housing for producing a laser beam;

a laser beam sweeping mechanism mounted within the hand-supportable housing for rotation about a rotational axis intersecting the central reference axis, where the intersection of the rotational axis and the central reference axis defines a central reference plane which extends along the longitudinal extent of the hand-supportable housing;

the laser beam sweeping mechanism having a plurality of rotating light reflective surfaces each being disposed at a different acute angle with respect to the rotational axis, for sequentially sweeping the laser beam about the rotational axis along a plurality of different paths;

a stationary array comprised of a plurality of stationary light reflective surfaces mounted within the hand-supportable housing with respect to the central reference axis and disposed substantially under the light transmission window; wherein at least two of the plurality of the stationary light reflective surfaces are symmetrically disposed on opposite sides of the central reference plane, and closely adjacent the laser beam sweeping mechanism;

a light collection subsystem disposed within the hand-supportable housing, and including (i) a light collection element, mounted along the central reference plane and adjacent at least two of the stationary light reflective surfaces, for allowing the laser beam produced from the laser beam producing mechanism to pass along a portion of the central reference plane, to the laser beam sweeping mechanism, for sweeping about the rotational axis thereof along the plurality of different paths, and (ii) a light receiver for receiving light from the light collection element at a point substantially within the central reference plane, and detecting the received light and producing an electrical signal indicative of the detected light;

a signal processor disposed within the hand-supportable housing, for processing the electrical signal and producing scan data representative of a scanned code symbol;

a control mechanism within the hand-supportable housing for controlling the operation of the hand-supportable laser scanner so that, during scanner operation, the laser beam produced from the laser beam producing mechanism passes along a portion of the central reference plane, to at least one of the rotating light reflective surfaces of the laser beam sweeping mechanism, and as the laser beam sequentially reflects off a plurality of the rotating light reflective surfaces, the laser beam is repeatedly swept across a plurality of the stationary light reflective surfaces, thereby producing a plurality of groups of plural scan lines, respectively, which are projected out through the light transmission window and intersect about a projection axis within an approximately collimated, frustral, or pyramidal scanning volume having an approximately columnar extent and extending from adjacent the light transmission window to at least about six inches therefrom so as to produce a collimated projected scanning pattern;

the hand-supportable housing is supportable relative to an object bearing a code symbol so that when a code symbol is presented within the collimated scanning volume, the code symbol is scanned omnidirectionally by the collimated scanning pattern, at least a portion of the laser light reflected from the scanned code symbol is directed through the light transmission window, reflected off at least one of the stationary light reflective surfaces, then reflected off at least one of the rotating light reflective surfaces of the laser beam sweeping mechanism, and thereafter the reflected laser light is collected by the light collection element to be received by the light receiver for detection, whereupon the electrical signal is produced for processing by the signal processor; and wherein the hand-supportable housing allows the user to control the direction of the projection axis by adjusting the movable bracket relative to the housing and observing the window of the housing, to thus align the collimated scanning volume with the bar code symbol on the object to be scanned and identified.

34. The laser scanner of claim 33, wherein the signal processor further comprises a data processor for decoding the scan data and producing data representative of the scanned code symbol.

35. The laser scanner of claim 33, wherein the different acute angles are selected so that the scan lines in each group of scan lines are substantially equidistant from each other throughout at least a range of distances from the light transmission window.

36. The laser scanner of claim 33, wherein the laser beam producing mechanism comprises a laser diode mounted with respect to the central reference axis.

37. The laser scanner of claim 33, wherein the first, second, third, and fourth stationary light reflective surfaces comprise first, second, third, and fourth mirrors, respectively.

38. The laser scanner of claim 33, wherein the collimated scanning pattern is oriented along the longitudinal extent of the hand-supportable housing and exits the window in a direction substantially normal to the window so as to facilitate scanning of code symbols presented to the collimated scanning volume.

39. The laser scanner of claim 33, wherein the movable stand is positionable upon a counter surface, and includes a position adjustment mechanism for supporting the hand-supportable housing in any one of a plurality of positions above the counter surface so that the collimated scanning pattern is projected about the projection axis above the counter surface in any one of a plurality of orientations corresponding to the plurality of positions.

40. The laser scanner of claim 33, wherein the light receiver comprises a photodetector.

41. The laser scanner of claim 40, wherein the photodetector is located on a circuit board, at a height above the laser beam sweeping mechanism, and substantially within the central reference plane.

42. The laser scanner of claim 33, wherein the code symbol is a bar code symbol.

43. The laser scanner of claim 33, wherein the light collecting element is a light collecting mirror having a focal distance, substantially at which the light receiver is located.

44. The laser scanner of claim 33, wherein each scan line in a first group of scan lines is substantially parallel to each other scan line in the first group of scan lines, and each scan line in a second group of scan lines is substantially parallel to each other scan line in the second group of scan lines.

45. An automatic projection laser scanning system comprising:
a hand-supportable housing having a light transmission aperture through which visible light can exit and enter into the hand-supportable housing;
a movable bracket adjustably mounted to the housing such that, if the movable bracket is mounted to a fixed surface, the movable bracket remains fixed, but permits adjustment of housing to any of a plurality of positions relative to the fixed surface;
a protective sheath encasing the housing that functions as a shock-absorbing mechanism to protect against damage if the bar code scanner is dropped or subjected to mechanical shock;
an object detector in the hand-supportable housing, for detecting an object located in a scanning volume extending externally from the hand supportable housing, and automatically generating an activation signal in response to the detection of the object located therein;
an activatable scan data reading mechanism in the hand-supportable housing, for reading scan data from a detected object located in the scanning volume, the scan data reading mechanism including:
a laser beam generator for generating a visible laser beam and directing the visible laser beam through the light transmission aperture and into the scanning volume,
a laser beam scanner for repeatedly scanning the visible laser beam so as to produce a highly collimated scanning pattern of approximately columnar extent within the scanning volume, for scanning a code symbol on the detected object presented therein
a laser light detector for detecting the intensity of laser light reflected off the bar code symbol and passing through the light transmission aperture as the visible laser beam is repeatedly scanned within the scanning volume, and
a receiver for automatically producing scan data indicative of the detected intensity;
an activatable scan data processor for processing produced scan data so as to detect and decode the bar code symbol on the detected object, and automatically producing symbol character data representative of the decoded bar code symbol; and
a control mechanism for controlling the operation of the automatic bar code symbol reading system;
wherein the movable bracket allows the user to control the direction of the projection axis by adjusting the position of the hand-supportable housing relative to the bracket, and thus align the approximately columnar scanning volume with the bar code symbol on the object to be scanned and identified.

46. The automatic projection laser scanning system of claim 45, wherein the laser beam generator comprises a laser diode.

47. The automatic projection laser scanning system of claim 45, wherein the bar code symbol has first and second envelope borders, and wherein the scan data processor comprises a detector adapted to detect the first and second envelope borders of the bar code symbol, and a mechanism for decoding the detected bar code symbol.

48. The automatic projection laser scanning system of claim 45, wherein the object detector comprises a receiver for receiving energy reflected from an object within an object detection field defined external to the housing and having an essentially volumetric extent, and wherein the collimated scanning pattern is characterized by at least one scanning plane having an essentially planar extent, and wherein the object detection field spatially encompasses at least a portion of the collimated scanning pattern.

49. The automatic projection laser scanning system of claim 45, wherein the laser beam generator is operated in a pulsed laser mode so as to generate a pulsed visible laser beam, which is directed through the light transmission aperture and repeatedly scanned across the collimated scanning pattern and the bar code symbol on the detected object.

50. The automatic projection laser scanning system of claim 49, wherein the object detector includes a transmitter for transmitting a pulse signal through a first optical element and into the scanning volume, a signal receiver for receiving the transmitted pulse signal reflected off the object in the scanning volume, and a signal comparator for comparing the received pulse signal with the transmitted pulse signal and automatically generating an activation signal indicative of the presence of the object in the scanning volume.

51. The automatic projection laser scanning system of claim 50, wherein the transmitter comprises an infra-red light source in the hand-supportable housing for producing an infra-red light pulse which is transmitted through the first optical element into the scanning volume, and wherein the receiver comprises an infra-red light detector and a second optical element for focusing reflected infra-red light pulses onto the infra-red light detector.

* * * * *